United States Patent [19]
Umebayashi et al.

[11] Patent Number: 5,789,062
[45] Date of Patent: Aug. 4, 1998

[54] MAGNETIC RECORDING MEDIUM

[75] Inventors: Nobuhiro Umebayashi, Tsukuba; Akira Miyake, Toride; Teruhisa Miyata; Yoshikazu Kai, both of Otokuni-gun, all of Japan

[73] Assignee: Hitachi Maxell, Ltd., Osaka, Japan

[21] Appl. No.: 74,832

[22] PCT Filed: Oct. 22, 1992

[86] PCT No.: PCT/JP92/01376

§ 371 Date: Jun. 15, 1993

§ 102(e) Date: Jun. 15, 1993

[30] Foreign Application Priority Data

Oct. 23, 1991 [JP] Japan ........................... 3-302699
Jan. 28, 1992 [JP] Japan ........................... 4-013148

[51] Int. Cl.$^6$ ........................... G11B 5/82; G11B 7/007
[52] U.S. Cl. ........................... 428/141; 428/323; 428/333; 428/336; 428/329; 428/65.3; 428/694 BN; 428/694 BA; 428/694 BR; 428/694 BS; 428/900; 360/135; 369/275.3; 369/275.4
[58] Field of Search ........................... 428/141, 323, 428/333, 402, 65.3, 694 B, 694 BR, 694 BA, 694 BH, 694 BN, 694 BM, 694 SG, 336, 329, 900; 360/110, 113, 135; 369/44.26, 44.34, 275.3, 275.4

[56] References Cited

U.S. PATENT DOCUMENTS

| | | | |
|---|---|---|---|
| 4,935,835 | 6/1990 | Goodwin et al. | 360/135 |
| 4,961,123 | 10/1990 | Williams et al. | 360/131 |
| 5,049,448 | 9/1991 | Ohya et al. | 428/409 |
| 5,319,507 | 6/1994 | Umebayashi et al. | 360/77.03 |

FOREIGN PATENT DOCUMENTS

| | | |
|---|---|---|
| 0368269 | 5/1990 | European Pat. Off. . |
| 0423661 | 4/1991 | European Pat. Off. . |
| 51-42485 | 11/1976 | Japan . |
| 58-17541 | 2/1983 | Japan . |
| 58-195356 | 11/1983 | Japan . |
| 64-37715 | 2/1989 | Japan . |
| 2154317 | 6/1990 | Japan . |
| 2187969 | 7/1990 | Japan . |

OTHER PUBLICATIONS

Database WPI, Derwent Publications, Ltd., AN–85–202382 & SU–A–1137513, Jan. 1985 (Abstract).

*Primary Examiner*—Stevan A. Resan
*Attorney, Agent, or Firm*—Birch, Stewart, Kolasch & Birch, LLP

[57] ABSTRACT

In a magnetic recording medium in which light is applied to a magnetic head-tracking optical recess and a data track between these recesses so as to effect a tracking of a magnetic head in accordance with light reflected by them, variation in light reflectance is limited to not more than 4 dB in a frequency range of 100 Hz to 2 KHz and a thickness of the magnetic layer at the data track, or a depth of the recess is set to a specified range so that a tracking servo can be effected properly, thereby enhancing reliability of the magnetic recording medium.

32 Claims, 15 Drawing Sheets

PRIOR ART

MAGNETIC RECORDING MEDIUM

TECHNICAL FIELD

This invention relates to a magnetic recording medium such for example as a flexible magnetic disk, and more particularly to a magnetic recording medium having recesses (hereinafter referred to as "magnetic head-tracking optical recesses" or "tracking optical recesses") enabling an optical tracking by a magnetic head, and still more specifically to a magnetic recording medium which comprises a substrate of a nonmagnetic material, and a magnetic layer formed on the substrate, the magnetic layer having a number of magnetic head-tracking optical recesses formed at predetermined intervals in its surface, and a data track for recording desired information thereon being formed between the magnetic head-tracking optical recess and the adjoining magnetic head-tracking optical recess.

PRIOR ART

Recently, with a wide spread of personal computers, wordprocessors and so on, external memory units used for them have been required to have a more compact design and a larger capacity. To meet these requirements, there has been proposed a flexible magnetic disk in which a reference track is formed at an innermost peripheral portion of a doughnut-like or annular recording region, and a number of magnetic head-tracking optical recesses of a ring shape are formed radially outwardly of the reference track at predetermined intervals in concentric relation to the reference track, and the annular region between the adjacent rings of magnetic head-tracking optical recesses serves as a data track (see, for example, Japanese Patent Unexamined Publication No. 2187969).

FIGS. 27 and 28 are an enlarged cross-sectional view and a plan view explanatory of a magnetic disk of this kind, respectively.

As shown in these Figures, a magnetic layer 101 is formed on a surface of a base film 100, and grooves 102 for tracking servo are formed, for example, by laser beam machining or the like to extend in a direction of rotation (i.e., circumferential direction) of the magnetic disk. A band-like region between the adjacent grooves 102, 102 serves as a data track 103 (see FIG. 30).

On the other hand, a magnetic recording/reproducing device comprises a light-emitting element (not shown) for emitting a light beam 104 for tracking servo to a surface of the above magnetic disk, and light-receiving elements 106a, 106b, 106c, 106d (see FIG. 30) for receiving reflection light 105 from the surface of the magnetic disk.

The light beam 104 emitted from the above light-emitting element is incident on the surface of the magnetic disk, and then the reflection light 105 is received by the light-receiving elements 106a, 106b, 106c, 106d.

As described above, since the grooves 102 for the tracking servo are formed in the magnetic layer 101, the intensity of the reflection light reflected on the data track 103 differs from the intensity of the reflection light reflected on the groove 102. In the example shown in FIG. 28, the tracking servo of a magnetic head (not shown) is carried out so that a sum of the outputs of the light-receiving elements 106a and 106b is equal to a sum of the outputs of the light-receiving elements 106c and 106d upon constant comparison of the two sums.

In the conventional magnetic disk, a thickness of the magnetic layer 101 is 1 to 3 μm, and therefore the reflection light 105 of a desired intensity could stably be received from the surface of the magnetic disk by the light-receiving elements 106a, 106b, 106c, 106d at a level clearly different from the intensity of the reflection light from the groove 102.

However, the inventors of the present invention have found that when the thickness of the magnetic layer is rendered as thin as less than 1 μm and particularly less than 0.9 μm in order to improve overwrite characteristics of the magnetic disk, the intensity of the reflection on the data track is liable to become dispersed or varied i.e. not to become constant, which results in a problem that a proper tracking servo is hardly effected.

The inventors of the present invention have made variously studies on this point, and as a result have found that there is a correlation between the thickness of the magnetic layer and the dispersion or variation of the reflection intensity on the data track.

Incidentally, in this kind of magnetic disk, optical characteristics of the medium are extremely important items. Specifically referring to these optical characteristics, (1) the contrast between the magnetic head-tracking optical recess and a flat portion other than these recesses is high, and (2) optical noises are low.

It is an object of this invention to provide a magnetic recording medium which overcomes at least partially the abovementioned problems of the prior art, and is high in reliability to enable a proper tracking servo.

DISCLOSURE OF THE INVENTION

According to a first aspect of the present invention, the above object is achieved by a magnetic recording medium in which a thickness of a magnetic layer at the data track is limited to any one of 0.31 to 0.45 μm, 0.55 to 0.67 μm and 0.81 to 0.97 μm.

In the magnetic recording medium according to the first aspect of the present invention, by limiting the thickness of the magnetic layer to the specified range, the intensity of light reflected on the data track is increased, so that the tracking servo of a magnetic head can be effected properly, utilizing the tracking optical recesses.

According to a second aspect of the present invention, the above object is achieved by a magnetic recording medium in which a depth of the magnetic head-tracking optical recess is limited to not less than 0.15 μm, and preferably to not less than 0.2 μm.

According to a third aspect of the present invention, the above object is achieved by a magnetic recording medium in which light is applied to the magnetic head-tracking optical recess and the data track so as to effect the tracking of the magnetic head in accordance with light reflected by the recess and the data track; wherein a variation in light reflectance is limited to not more than 4 dB in a frequency range of between more than 100 Hz and less than 2 KHz, or an X-ray is applied at predetermined intervals to a surface of the magnetic layer to form a constant diameter spot thereon, and a standard deviation of a count value of a fluorescent X-ray, obtained when measuring the amount of the fluorescence X-ray of iron per second which is generated from the magnetic layer, is limited to not more than 1.5 counts/second.

In the magnetic recording medium according to the third aspect of the present invention, directing attention to the specified frequency range, the variation in the light reflectance of the magnetic layer at the specified frequency range is limited to the predetermined value, or the standard deviation of the fluorescence X-ray count value is limited to the predetermined value, thereby the variation of the light reflectance being small, and a stable servo signal being obtained, so that the tracking servo of the magnetic head can be properly effected, utilizing the tracking optical recesses.

DETAILED DESCRIPTION OF THE PREFERRED EMBODIMENTS

Non-limitative embodiments of the present invention will now be described with reference to the drawings.

Figure 1:
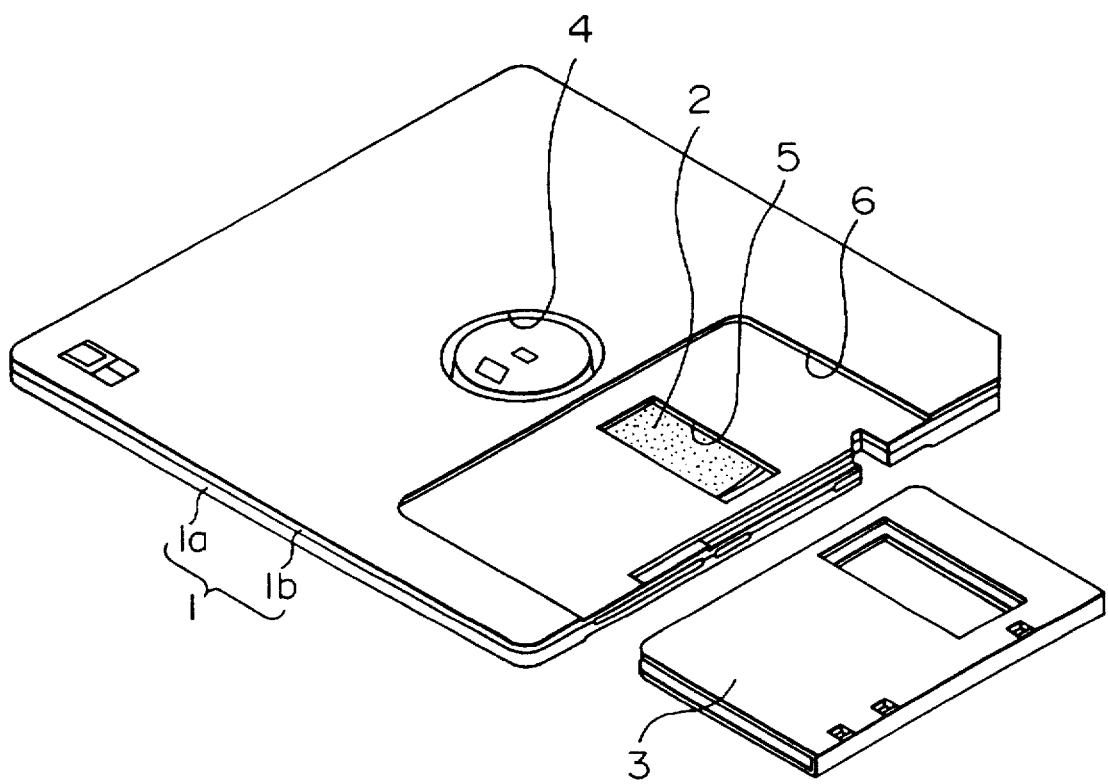
FIG. 1 is an oblique view of a magnetic disk cartridge according to an embodiment of the present invention, with a part thereof disassembled.
Figure 2:
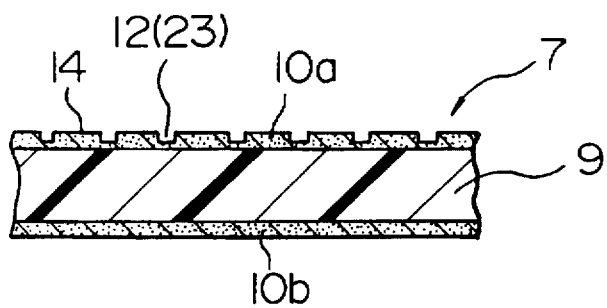
FIG. 2 is an enlarged sectional view of a magnetic sheet.
Figure 3:
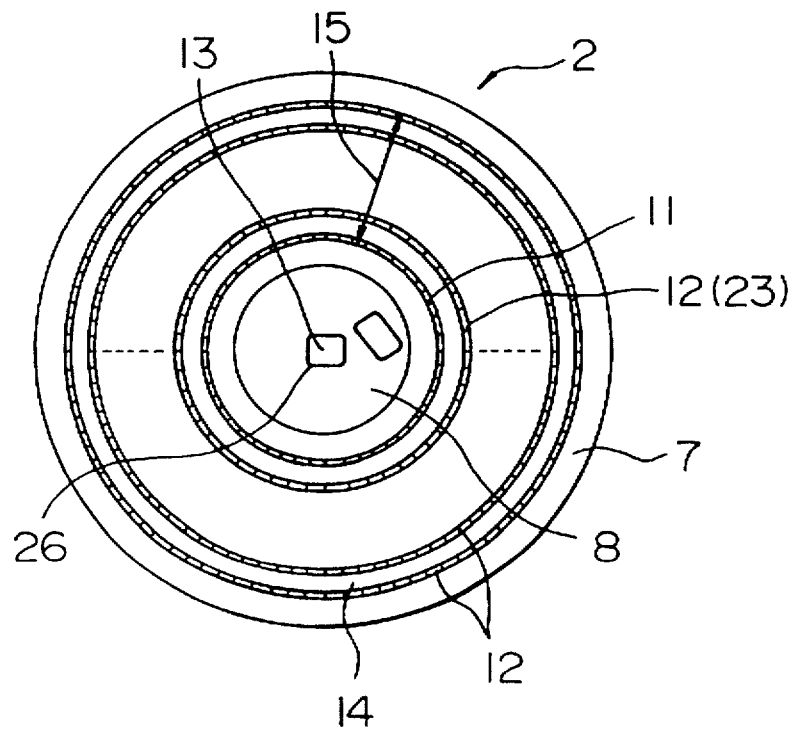
FIG. 3 is a plan view of a magnetic disk.

FIG. 1 is an oblique view showing a magnetic disk cartridge according to an embodiment, with a part thereof disassembled. FIG. 2 is an enlarged sectional view of a magnetic sheet, and FIG. 3 is a plan view of a magnetic disk.

As shown in FIG. 1, the magnetic disk cartridge mainly comprises a cartridge case 1, a flexible magnetic disk 2 rotatably housed in this cartridge case, a shutter 3 slidably mounted on the cartridge case 1, and cleaning sheets (not shown) fused to inner surfaces of the cartridge case 1.

The cartridge case 1 is composed of an upper case 1a and a lower case 1b, these cases being injection-molded, for example, of a hard synthetic resin such as an ABS resin.

A hole 4 for insertion of a rotation drive shaft therethrough is formed through a generally central portion of the lower case 1b, and a head insertion hole 5 of a rectangular shape is formed near it. Although not shown in the drawing, a head insertion hole 5 is similarly formed through the upper case 1a.

Each of the upper and lower cases 1a and 1b is slightly recessed adjacent to its front edge to provide a depression 6 for limiting a range of sliding movement of the shutter 3. The above head insertion hole 5 is open at an intermediate portion of the depression 6.

As shown in FIG. 3, the magnetic disk 2 comprises a doughnut-like or annular flexible magnetic sheet 7, and a center hub 8 of metal or a synthetic resin inserted in and bonded to a center hole of the magnetic sheet 7.

As shown in FIG. 2, the magnetic sheet 7 comprises a base film 9, and magnetic layers 10a, 10b formed by coating respectively on the opposite faces of the base film 9.

The base film 9 is composed, for example, of a synthetic resin film such as polyethylene terephthalate (PET), polyethylene naphthalate (PEN) and a polyimide.

The magnetic layers 10a, 10b are composed of a mixture of ferromagnetic powder, a binder, abrasive powder and a lubricant etc.

Fine powder, for example, of barium ferrite, strontium ferrite, α-Fe, Co—Ni, Co—P, γ-$Fe_2O_3$, $Fe_3O_4$, Co-containing γ-$Fe_2O_3$, Co-containing $Fe_3O_4$, $CrO_2$, Co, or Fe—Ni is used as the above ferromagnetic powder.

As the binder, for example, vinyl chloride-vinyl acetate copolymer, vinyl chloride-vinyl acetate-vinyl alcohol copolymer, urethane resin, polyisocyanate compound, or a radiation-curing resin is used.

As the abrasive powder, for example, aluminum oxide, chromium oxide, silicon carbide, or silicon nitride is used. It is suitable that a percentage of addition of the abrasive powder be about 0.1 wt. % to about 25 wt. % relative to the magnetic powder.

As the lubricant, for example, higher fatty acid such as stearic acid and oleic acid, higher fatty acid ester such as oleyl oleate and glycerin oleate, liquid paraffin, squalane, a fluoroplastics, fluorine oil, or silicone oil can be used. It is suitable that the percentage of addition of this lubricant be 0.1 wt. % to 25 wt. % relative to the magnetic powder.

Specific examples of the magnetic coating composition are given in the following.

EXAMPLE 1 OF MAGNETIC COATING COMPOSITION

Barium ferrite
 (in a plate-like shape) 100 partsby weight
 (Coercive force Hc: 530 [Oe],
  Saturation magnetization: 57 [emu/g], Plate diameter: 0.05 [μm])
Vinyl chloride-vinyl acetate-vinyl alcohol copolymer 11.0 parts by weight
Urethane resin 6.6 parts by weight
Trifunctional isocyanate compound 4.4 parts by weight
Aluminum oxide powder 15 parts by weight
 (Average particle size: 0.43 [μm])
Carbon black 2 parts by weight
 (Average particle size: 0.3 [μm])
Carbon black 2 parts by weight
 (Average particle size: 0.02 [μm])
Oleyl oleate 6 parts by weight
Cyclohexane 150 parts by weight
Toluene 150 parts by weight

EXAMPLE 2 OF MAGNETIC COATING COMPOSITION

α-Fe 100 parts by weight
 (Coercive force Hc: 1650 [Oe],
  Saturation magnetization: 135 [emu/g],
  major axis length: 0.25 [μm]
  average aspect ratio: 8)
Vinyl chloride-vinyl acetate-vinyl alcohol copolymer 14.1 parts by weight
Urethane resin 8.5 parts by weight
Trifunctional isocyanate compound 5.6 parts by weight
Aluminum oxide powder 20 parts by weight
 (Average particle size: 0.43 [μm])
Carbon black 2 parts by weight
 (Average particle size: 0.3 [μm])
Carbon black 2 parts by weight
 (Average particle size: 0.02 [μm])
Oleyl oleate 6 parts by weight
Cyclohexane 150 parts by weight
Toluene 150 parts by weight The components of each of the above magnetic coating composition examples 1 and 2 are sufficiently mixed together and dispersed in a ball mill to prepare the magnetic coating material, and this coating material is coated onto both sides of a base film of polyethylene terephthalate (PET) having a thickness of 62 μm in such a manner that each coated layer, when dried, has an average thickness of 0.79 μm. The coated layers are dried, and then are subjected to calendering to form the magnetic layers 10a, 10b, respectively.

EXAMPLE 3 OF MAGNETIC COATING COMPOSITION

Barium ferrite 100 parts by weight
 (Coercive force Hc: 530 [Oe],
  Saturation magnetization:
  57 [emu/g], Average particle
  size: 0.04 [μm])
Vinyl chloride-vinyl acetate-vinyl alcohol copolymer 11.0 parts by weight
Urethane resin 6.6 parts by weight
Trifunctional isocyanate compound 4.4 parts by weight
Aluminum oxide powder 15 parts by weight
 (Average particle size: 0.43 [μm])
Carbon black 2 parts by weight
Oleyl oleate 7 parts by weight
Cyclohexane 150 parts by weight
Toluene 150 parts by weight Like the composition examples 1 and 2, the components of the magnetic coating composition example 3 are sufficiently mixed together and dispersed in a ball mill to prepare the magnetic coating material, and this coating material is coated onto both sides of a base film of polyethylene terephthalate (PET) having a thickness of 62 μm in such a manner that each coated layer, when dried, has an average thickness of 0.89 μm. The coated layers are dried, and then are subjected to calendering to form the magnetic layers 10a, 10b, respectively.

As shown in FIG. 3, a reference track 11 and a multiplicity of magnetic head-tracking optical tracks (recesses) 12 are formed on a surface of the magnetic layer 10a of the thus formed magnetic disk 2 by embossing or the like. The reference track 11 and the magnetic head-tracking optical tracks 12 are arranged in concentric circles having their center on an axis 13 of rotation of the magnetic disk 2.

A data track 14 for recording desired information is formed between any one of the magnetic head-tracking optical track 12 and the adjoining magnetic head-tracking optical track 12.

As shown in FIG. 3, the reference track 11 is formed at the innermost peripheral portion of a recording region 15 provided on the magnetic disk 2, and a multiplicity of magnetic head-tracking optical tracks 12 and a multiplicity of data tracks 14 are alternately formed radially outwardly of the reference track, that is, radially outwardly in a direction perpendicular to a direction of travel of the magnetic head.

Figure 4:
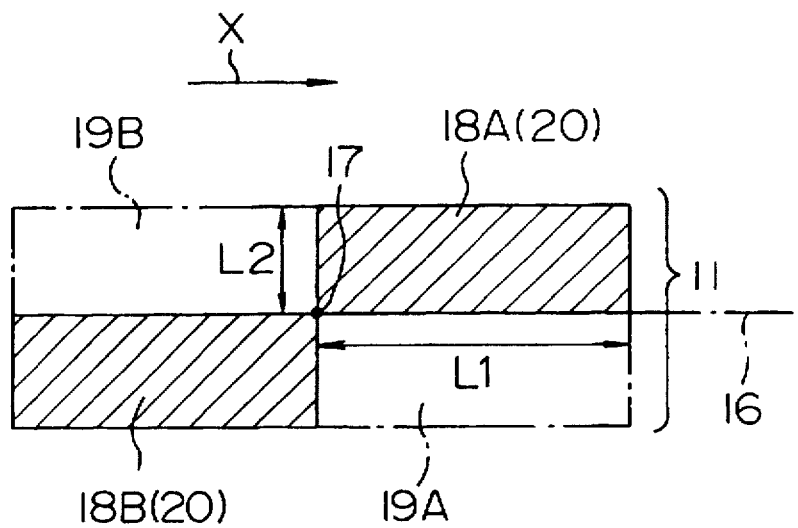
FIG. 4 is an enlarged plan view of a part of a reference track.

As shown in FIG. 4, the reference track 11 extends along the direction X of travel of the magnetic head (the circumferential direction), and a pair of rectangular reference recess regions 18A and 18B are formed symmetrically about an arbitrary point 17 on a centerline 16 of the reference track 11. A flat portion 19A with no recess is provided adjacent to the reference recess region 18A (that is, forwardly of the reference recess region 18B), and also a flat portion 19B with no recess is provided adjacent to the reference recess region 18B (that is, rearwardly of the reference recess region 18A).

Multiple pairs of such reference recess regions 18A and 18B and multiple pairs of such flat portions 19A and 19B are provided discretely or continuously along the direction X of travel of the magnetic head to thereby form the reference track 11.

In this embodiment, a length L1 of the reference recess region 18A, 18B in the direction of travel of the magnetic head is 2.4 mm, and a length L2 thereof in its widthwise direction is 18 μm.

Predetermined signals are recorded beforehand on the reference track 11, and the magnetic head scanningly moves over the reference track, and in response to output waveforms obtained at this time, the center position of the magnetic head, that is, the (center) position of a magnetic gap of the magnetic head, can be brought into the centerline 16 of the reference track 11.

The magnetic head (the magnetic gap) is thus brought into registry with the centerline 16 of the reference track 11 (that is, a reference position), and at the same time by the use of a photodetector (later described) comprising a light-emitting element and a group of light-receiving elements which are connected to the magnetic head, the current position of the photodetector between the magnetic head-tracking optical tracks 12 is detected. Then, the amount of positional deviation of the photodetector from the optical tracks 12 is calculated, and the tracking servo of the magnetic head is effected in accordance with this deviation amount in a manner described below.

Figure 5:
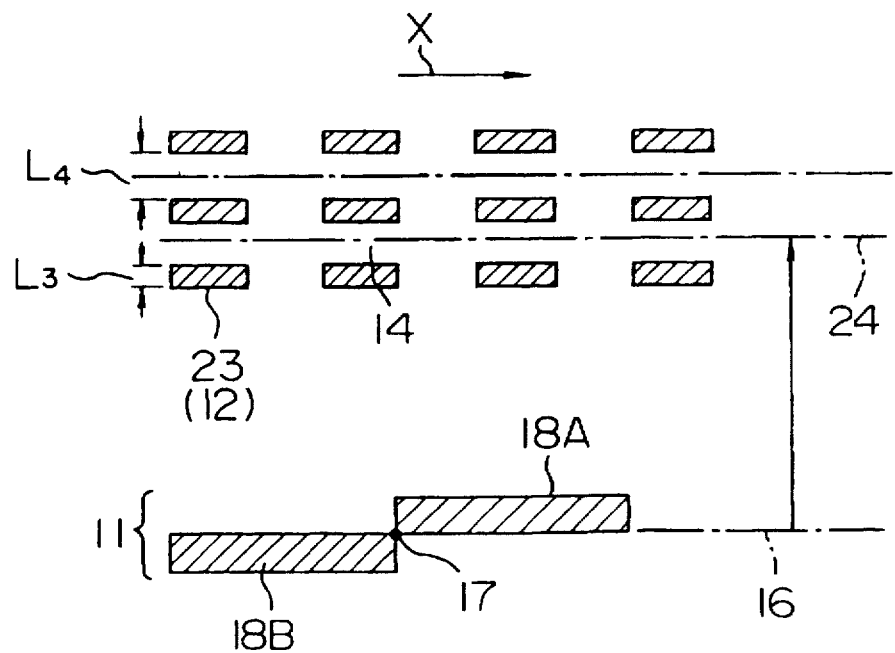
FIG. 5 is a view explanatory of the reference track and magnetic head-tracking optical tracks.

Thereafter, a motor for transferring a magnetic head carriage is rotated to shift the center position of the magnetic head to a position near a centerline 24 of the data track disposed at the innermost peripheral portion (see FIG. 5).

The tracking servo of the magnetic head is effected for each track, utilizing the magnetic head-tracking optical tracks 12.

FIGS. 5 to 9 are illustrations explanatory of the tracking servo of the magnetic disk 2. As shown in FIG. 5, tracking recesses 23 are also formed in the magnetic head-tracking optical track 12 discretely along the direction X of travel of the magnetic head. These recesses 23 may be formed continuously to form an annulus.

In this embodiment, a width L3 of the discrete tracking recesses 23 is 5 μm, and a width L4 of the data track 14 is 15 μm.

Figure 6:
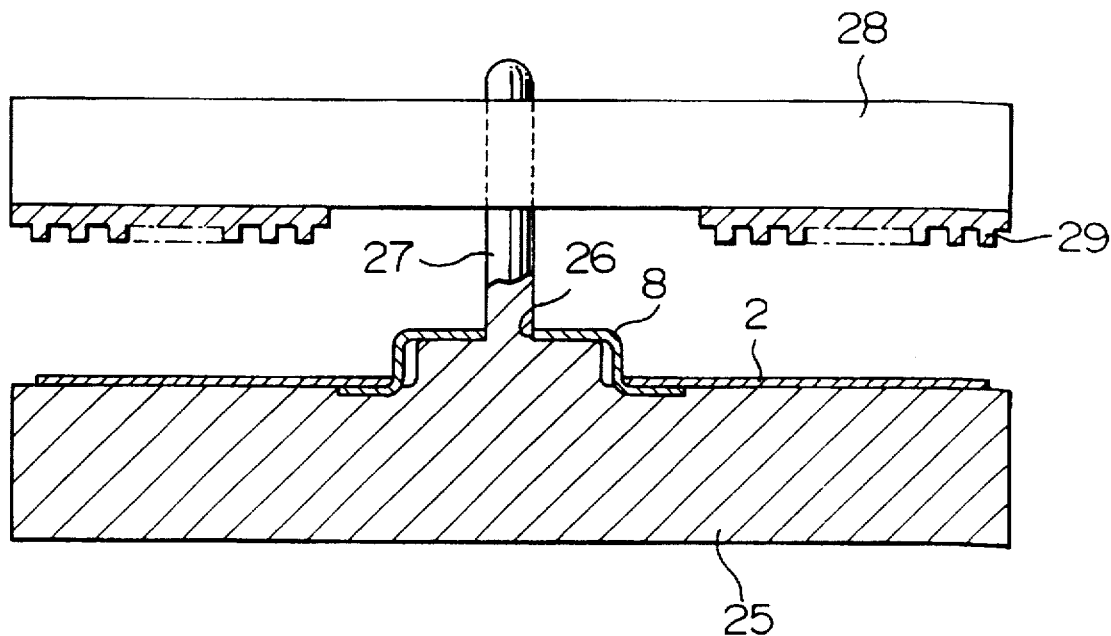
FIG. 6 is a sectional view showing a device for forming the reference track and the magnetic head-tracking optical tracks.

As shown in FIG. 6, the reference recess regions 18A, 18B and the tracking recesses 23 are formed simultaneously by pressing (embossing).

As shown in this Figure, the magnetic disk 2 having the center hub 8 attached thereto is set on a base 25. Preferably, in this magnetic disk 2, the surfaces of the magnetic layers 10a, 10b are polished to a predetermined surface roughness at a preceding step.

The base 25 has a center pin 27 projected therefrom which pin is to be inserted into a center hole 26 of the center hub 8 (see also FIG. 3), and by inserting the center pin 27 into the center hole 26 of the hub 8, the magnetic disk 2 is positioned on the base 25.

A stamper 28 is disposed above the base 25 in parallel relation thereto so as to move upward and downward, and the upward and downward movement of the stamper 28 is guided by the center pin 27. A multiplicity of fine projections 29 for forming the reference recess regions 18A, 18B and the tracking recesses 23 are formed on the lower surface of the stamper 28.

The stamper 28 is moved downward from the position shown in FIG. 6, so that the magnetic disk 2 is held between the base 25 and the stamper 28 under a predetermined pressure. Thus, the projections 29 formed on the stamper 28 bite into the surface of the magnetic layer 10a, so that the reference recess regions 18A, 18B and the tracking recesses 23 of a generally trapezoidal section are formed by compression and plastic deformation (flow).

Figure 7:
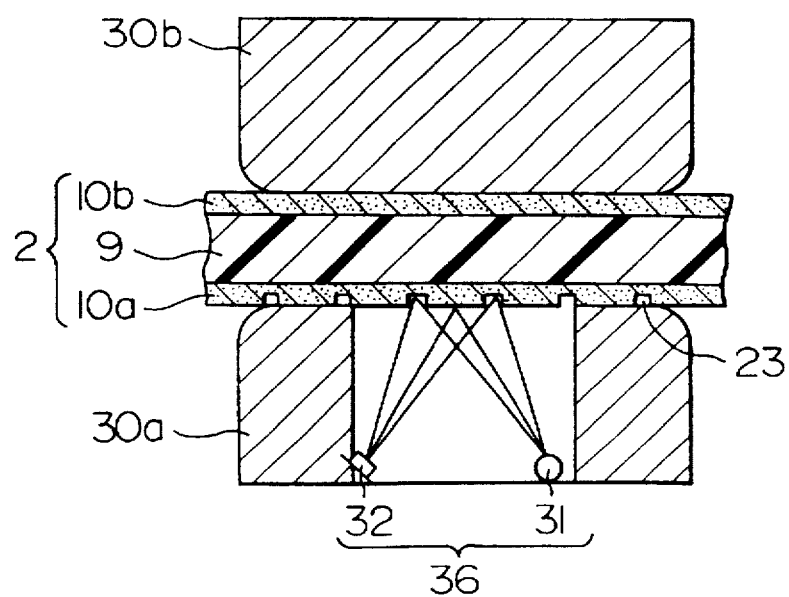
FIG. 7 is a sectional view explanatory of a tracking servo of a magnetic head.

As shown in FIG. 7, at a time of recording or reproduction, the magnetic disk 2 is rotated while being situated between magnetic heads 30a and 30b. The light-emitting element 31, such for example as an LED, for emitting light for the tracking servo, as well as a light-receiving element group 32 constituted by of a plurality of light-receiving elements (photoelectric conversion elements) for receiving the reflected light from the magnetic layer 10a are integrally mounted as a detector 36 on the magnetic head 30a. That portion of the magnetic head 30a where the light-emitting element 31 and the lightreceiving element group 32 are mounted is open toward the magnetic disk 2.

Figure 8:
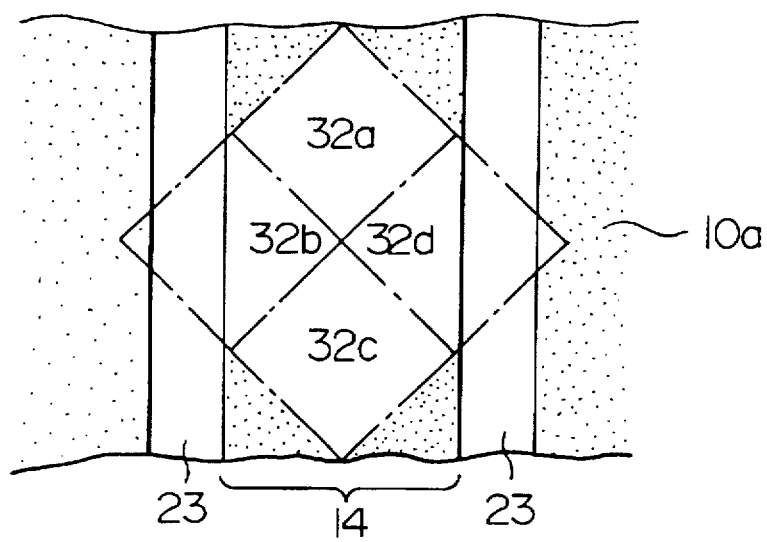
FIG. 8 is a view explanatory of an arrangement of lightreceiving elements.
Figure 9:
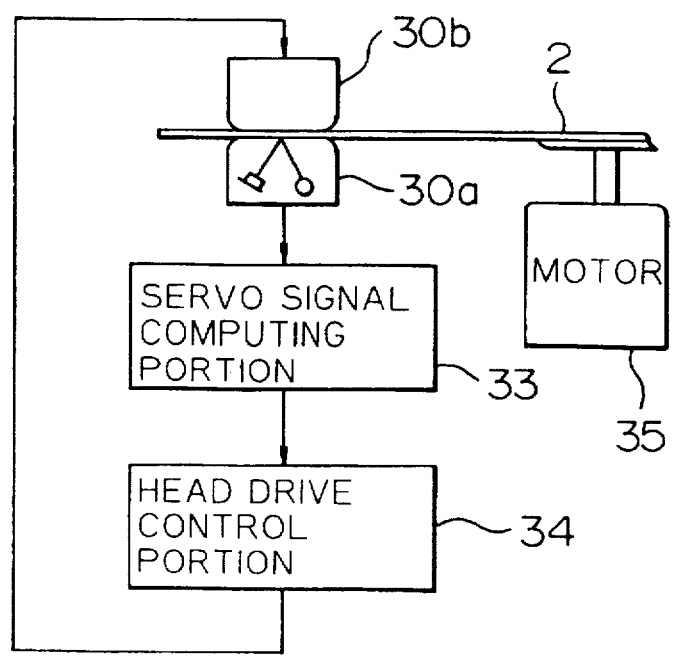
FIG. 9 is a sectional view explanatory of a tracking control of the magnetic head.

As shown in FIG. 8, the light-receiving element group 32 is constituted by four light-receiving elements 32a, 32b, 32c, 32d, and the light reflected by the data track 14 and the tracking recesses 23 is received by these light-receiving elements 32a, 32b, 32c, 32d. The photoelectric conversion output of each of the light-receiving elements 32a, 32b, 32c, 32d, which depends on an intensity of the reflected light and an area of a flux of the received light, is given to a servo signal computing portion 33, as shown in FIG. 9. A position correction signal obtained at this servo signal computing portion 33 is given to a head drive control portion 34, and the tracking control of the magnetic head 30 is effected in accordance with a control signal from the head drive control portion. Reference numeral 35 denotes a motor for rotating the magnetic disk 2.

As described above, in order to improve the overwrite characteristics to reduce the noises, the thickness of the magnetic layer 10 need to be less than 1 μm; however, if this is done, the intensity of the reflected light reflected on the data track 14 is liable to become varied, which poses a new problem that it is difficult to carry out a proper tracking servo.

EXAMPLES OF THE FIRST GROUP OF THE INVENTION

In the following Examples, a common objective exists, in that the inventors of the present invention have conducted various experiments concerning relationship of the thickness of the magnetic layer 10 with the intensity of the reflected light reflected on the data track 14 and the overwrite characteristics.

Variously changing the thickness of the magnetic layer 10 of the composition example 3, the reflectance of the data track magnetic layer 14 as well as the overwrite characteristics for the various values of the magnetic layer thickness, were measured, wherein the center wavelength (λ) of the light emitted from the light-emitting element 31 (comprising an infrared light-emitting diode) was 880 nm, and an incident angle (θ) of its light was 20 degrees, and Table 1 below shows results thereof.

As regards the overwrite characteristics, a signal of 150 Hz was first written onto the data track 14, and then a signal of 600 Hz was overwritten on the data track on which the signal of 150 Hz had been written, and the reproduction output of the residual 150 Hz signal was measured.

TABLE 1

| Thickness of magnetic layer (μm) | Reflectance (%) | Overwrite characteristics (dB) |
| --- | --- | --- |
| 0.24 | 6.2 | −42.2 |
| 0.31 | 10.5 | −40.5 |
| 0.35 | 11.0 | −40.3 |
| 0.37 | 11.3 | −40.0 |
| 0.43 | 11.0 | −39.5 |
| 0.45 | 10.0 | −39.0 |
| 0.50 | 6.4 | −38.0 |
| 0.55 | 10.2 | −36.2 |
| 0.59 | 11.0 | −36.0 |
| 0.62 | 11.3 | −35.7 |
| 0.66 | 11.0 | −33.5 |
| 0.67 | 10.5 | −33.3 |
| 0.70 | 8.1 | −33.0 |
| 0.74 | 6.5 | −32.8 |
| 0.81 | 10.8 | −32.6 |
| 0.85 | 11.0 | −31.2 |
| 0.89 | 11.2 | −30.3 |

TABLE 1-continued

| Thickness of magnetic layer (μm) | Reflectance (%) | Overwrite characteristics (dB) |
| --- | --- | --- |
| 0.94 | 11.0 | −30.0 |
| 0.97 | 10.4 | −29.8 |
| 1.15 | 10.8 | −26.5 |
| 1.40 | 11.2 | −25.2 |
| 1.65 | 10.7 | −23.1 |

As is apparent from the results in this Table 1, the reflectance and the overwrite characteristics greatly vary depending on the thickness of the magnetic layer 10 (the thickness of the magnetic layer 10 at the data track 14), and the reflectance is low when the thickness of the magnetic layer 10 is around 0.24 μm, 0.50 μm, 0.70 μm, 0.74 μm and 0.99 μm. On the other hand, when the thickness of the magnetic layer 10 is more than 1.15 μm, the overwrite characteristics is poor though the reflectance is always high.

On the other hand, when the thickness of the magnetic layer 10 is limited to any one of 0.31 to 0.45 μm, 0.55 to 0.67 μm and 0.81 to 0.97 μm, a high reflectance (not less than 10%) and good overwrite characteristics (not more than about −30 dB) can be obtained, and particularly when the thickness of the magnetic layer 10 is limited to any one of 0.35 to 0.43 μm, 0.59 to 0.66 μm and 0.85 to 0.94 μm, a higher reflectance and good overwrite characteristics (not more than −30 dB) can be obtained.

Next, the thickness of the magnetic layer 10 was fixed to 0.89 μm, and variously changing the center wavelength (λ) of the light emitted from the light-emitting element 31, as well as the angle (θ) of incidence of this light on the magnetic layer 10, the reflectance at the magnetic layer 10 was measured, and it has been found that the center wavelength (λ), the incident angle (θ) and the reflectance are closely related to one another. Results thereof are collectively shown in FIG. 10.

Figure 10:
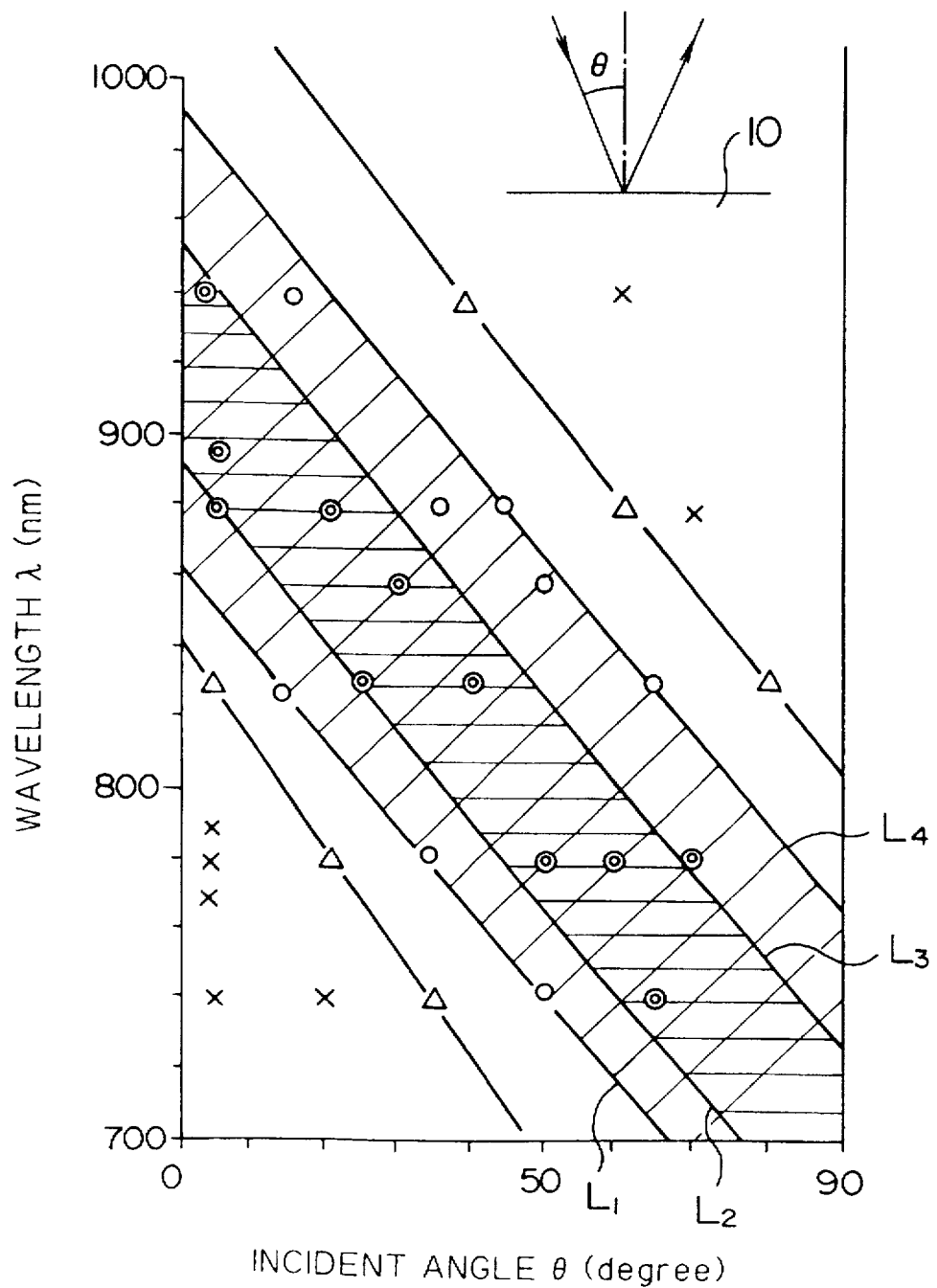
FIG. 10 is a correlation diagram showing relationship between a central wavelength of light, emitted from a lightemitting element, and an incident angle.

This FIG. 10 is a diagram of correlation between the center wavelength and the incident angle of the light, in which the ordinate axis represents the center wavelength (λ) of the light emitted from the light-emitting element 31, and the abscissa axis represents the angle (θ) of incidence of the light on the magnetic layer 10. In this Figure, mark ⊙ represents that the reflectance at the magnetic layer 10 but not less than 11%, mark ○ represents that the reflectance was not less than 10% and less than 11%, mark Δ represents that the reflectance was not less than 8% but less than 10%, and mark X represents that the reflectance was less than 8.

As is clear from this Figure, the condition in which the center wavelength (λ) is between 740 nm to 940 nm, and the incident angle (θ) of the light is not more than 70 degrees can be used as the condition for obtaining the relatively high reflectance. Namely, even if the film thickness of the magnetic layer 10 is the same, a stable, high reflectance can be obtained by suitably combining the center wavelength (λ) of the light, emitted from the light-emitting element 31, with the incident angle (θ) of this light.

Namely, in the diagram of correlation between the center wavelength (λ) and the incident angle (θ) of the light, i.e. in the FIG. 10, a straight line $L_1$ is represented by $$\lambda_1 = -2.2\theta + 860 \ [nm] \tag{1}$$

a straight line $L_2$ is represented by $$\lambda_2 = -2.2\theta + 890 \ [nm] \tag{2}$$

a straight line $L_3$ is represented by $$\lambda_3 = -2.2\theta + 950 \ [nm] \tag{3}$$

and
a straight line $L_4$ is represented by $$\lambda_4 = -2.2\theta + 990 \ [nm] \tag{4}$$

Therefore, when the center wavelength (λ) of the light and the incident angle of the light are within a range surrounded by the straight lines $L_1$ and $L_4$, it is ensured that the reflectance of not less than 10% can be obtained, and when they are within a range surrounded by the straight lines $L_2$ and $L_3$, it is ensured that the reflectance of not less than 11% can be obtained.

The reflectance at various magnetic layers 10 different in thickness was measured, wherein the center wavelength of the light emitted from the light-emitting element 31 (comprising an infrared light-emitting diode) was 830 nm, and the angle of incidence of the light on the magnetic layer 10 was 40 degrees, and Table 2 below shows results thereof.

TABLE 2

| Thickness of magnetic layer (μm) | Reflectance (%) |
| --- | --- |
| 0.24 | 6.1 |
| 0.31 | 10.7 |
| 0.35 | 11.0 |
| 0.37 | 11.5 |
| 0.43 | 11.0 |
| 0.45 | 10.3 |
| 0.50 | 6.2 |
| 0.55 | 10.3 |
| 0.59 | 11.1 |
| 0.62 | 11.3 |
| 0.66 | 11.0 |
| 0.67 | 10.5 |
| 0.70 | 7.5 |
| 0.74 | 6.0 |
| 0.81 | 10.6 |
| 0.85 | 11.1 |
| 0.89 | 11.2 |
| 0.94 | 11.0 |
| 0.97 | 10.2 |
| 1.15 | 10.5 |
| 1.40 | 11.5 |
| 1.65 | 10.3 |

The reflectance at the surface of various magnetic layers 10 different in thickness was measured, wherein the center wavelength of the light emitted from the light-emitting element 31 (comprising a semiconductor laser) was 780 nm, and the angle of incidence of the light on the magnetic layer 10 was 60 degrees, and Table 3 below shows results thereof.

TABLE 3

| Thickness of magnetic layer (μm) | Reflectance (%) |
| --- | --- |
| 0.24 | 6.5 |
| 0.31 | 10.3 |

TABLE 3-continued

| Thickness of magnetic layer (μm) | Reflectance (%) |
|---|---|
| 0.35 | 11.5 |
| 0.37 | 11.3 |
| 0.43 | 11.1 |
| 0.45 | 10.2 |
| 0.50 | 6.0 |
| 0.55 | 10.2 |
| 0.59 | 11.0 |
| 0.62 | 11.5 |
| 0.66 | 11.1 |
| 0.67 | 10.5 |
| 0.70 | 7.8 |
| 0.74 | 6.6 |
| 0.81 | 10.7 |
| 0.85 | 11.0 |
| 0.89 | 11.2 |
| 0.94 | 10.9 |
| 0.97 | 10.4 |
| 1.15 | 10.5 |
| 1.40 | 11.0 |
| 1.65 | 10.6 |

As is apparent from the results of Table 2 and Table 3, when the thickness of the magnetic layer 10 is limited to any one range of 0.31 to 0.45 μm, 0.55 to 0.67 μm and 0.81 to 0.97, a high reflectance (not less than 10%) and good overwrite characteristics (not more than −30 dB) can be obtained, and particularly when the thickness of the magnetic layer 10 is limited to an one range of 0.35 to 0.43 μm, 0.59 to 0.66 μm and 0.85 to 0.94 μm, a higher reflectance and better over write characteristics can be obtained.

To have such high reflectance means that the difference between the reflectance at the tracking recess 23 and the reflectance at the data track 14 becomes large, so that the tracking servo of the magnetic head is effected properly.

Further, the inventors of the present invention have made various measurements concerning relationship between the average particle size of the magnetic powder in the magnetic layer and variations of the reflectance, wherein the thickness of the magnetic layer was fixed to 0.89 μm, the center wavelength of the light emitted from the light-emitting element 31 comprising an infrared light-emitting diode was 880 nm, and the angle of incidence of the light from the light-emitting element 31 on the magnetic layer 10 was 20 degrees. Table 4 below shows results thereof.

TABLE 4

| Average particle size of magnetic layer (μm) | Reflectance (%) |
|---|---|
| 0.08 | 8.7 to 10.3 |
| 0.06 | 10.5 to 11.3 |
| 0.04 | 10.8 to 11.5 |

It will be apparently appreciated from this Table that when the average particle size of the magnetic powder is not more than 0.06 μm, variations in the reflectance are small, so that a constant quality is obtained.

Particularly, ferrite, such as barium ferrite or strontium ferrite, of a plate-like shape is suitably used as this magnetic powder. The barium ferrite contains BaO.6Fe2O3 as a main component, and the strontium ferrite comprises SrO.6Fe2O3 as a main component, and both have a hexagonal crystalline structure.

Further, the inventors of the present invention have made various measurements concerning relationship between the surface roughness (Ra) of the magnetic layer and variations of the reflectance, wherein the thickness of the magnetic layer was fixed to 0.89 μm, the average wavelength of the light emitted from the light-emitting element 31 comprising an infrared light-emitting diode was 880 nm, the angle of incidence of the light from the light-emitting element 31 on the magnetic layer 10 was 20 degrees, and barium ferrite having the average particle size of 0.04 μm was used as the magnetic powder. Table 5 below shows results thereof.

TABLE 5

| Surface roughness of magnetic layer (Ra) | Reflectance (%) |
|---|---|
| 0.020 | 7.0 to 9.5 |
| 0.015 | 10.5 to 11.3 |
| 0.006 | 11.2 to 12.2 |

It will be apparently appreciated from this Table that when the surface roughness (Ra) of the magnetic layer is not more than 0.015 μm, variations in the reflectance are small, so that a constant quality is obtained. Incidentally, the surface roughness (Ra) of this magnetic layer can be adjusted to a desired value, for example, by controlling the conditions of the calendering.

Figure 11:
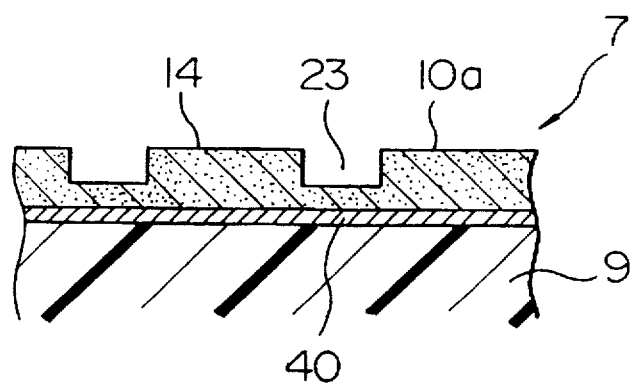
FIG. 11 is an enlarged sectional view showing another embodiment of a magnetic recording medium.

FIG. 11 is an enlarged sectional view showing another embodiment of the present invention. In this embodiment, a reflective film 40, comprising as a main component, for example, metal such as aluminum, tin, nickel and copper, or metal oxide such as titanium oxide, is formed on a base film 9, and a magnetic layer 10a having the tracking recesses 23 is formed on this reflective film.

In this embodiment, also, the thickness of the magnetic layer 10a as well as the particle size of the magnetic powder and the surface roughness of the magnetic layer 10a are limited to ranges as described above.

EXAMPLES OF THE SECOND GROUP OF THE INVENTION

In the following Examples, a common objective exists in that the inventors of the present invention have studied relationship between a depth of the magnetic head-tracking optical recess 23 in the magnetic layer 10 of the composition example 3 and a difference signal output related to the intensity of the reflection light at this recess.

The thickness of the coating (the magnetic layer 10) at the data track portion 14 was 0.60 μm, and light from the light-emitting element was applied to the magnetic head-tracking recess 23, and the reflected light was received by the four-divided photodetector 32, and Table 6 below shows the relationship between a difference of signals from a pair of detector elements (for example, 32a and 32b), positioned respectively over the data track 14 and the magnetic head-tracking optical recess 23, and the depth of the magnetic head-tracking optical recess 23.

TABLE 6

| Depth of recess (μm) | Difference signal output (V) |
|---|---|
| 0.05 | 1.8 |
| 0.10 | 3.0 |
| 0.13 | 3.7 |
| 0.15 | 4.2 |
| 0.17 | 4.3 |

TABLE 6-continued

| Depth of recess (μm) | Difference signal output (V) |
| --- | --- |
| 0.20 | 4.8 |
| 0.23 | 5.3 |
| 0.25 | 5.8 |
| 0.30 | 6.2 |
| 0.35 | 6.5 |
| 0.40 | 6.3 |
| 0.45 | 5.8 |
| 0.50 | 6.0 |

The difference signal output not less than 4.0 V is required for the servo for the tracking. As shown in Table 6, when the depth of the recess 23 is not less than 0.15 μm, the difference signal output for the servo is not less than 4.0 V, and further when the depth is not less than 0.20 μm, the output is not less than 4.5 V. Table 7 below shows relationship between the depth of the recess and the difference signal output when the coating (magnetic layer) of the data track 14 was 0.65 μm.

TABLE 7

| Depth of recess (μm) | Difference signal output (V) |
| --- | --- |
| 0.05 | 1.0 |
| 0.10 | 2.5 |
| 0.13 | 3.2 |
| 0.15 | 4.0 |
| 0.18 | 4.3 |
| 0.20 | 4.4 |
| 0.23 | 4.5 |
| 0.25 | 4.6 |
| 0.30 | 4.8 |
| 0.35 | 5.0 |
| 0.40 | 5.2 |
| 0.45 | 5.0 |
| 0.50 | 5.0 |

If the depth of the recess 23 is not less than 0.15 μm, the difference output as the servo signal is not less than 4.0 V to enable a sufficient tracking, even if the coating thickness of the data track portion 14 is changed.

In the foregoing, although the embossing process using the stamper has been explained as means for forming the tracking optical recesses, the present invention is not limited to this, but the tracking optical recesses may be formed by other method for example such as a laser cutting method and a etching.

EXAMPLES OF THE THIRD GROUP OF THE INVENTION

In the following Examples, a common objective exists in that the relationship of the thickness of the magnetic layer 10 with overwrite characteristics etc. in the magnetic disk were experimentally studied in further detail, and results thereof will now be explained.

The thickness of the magnetic layer 10 of the composition example 1 was variously changed, and the overwrite characteristics for the various values of the magnetic layer thickness were measured as in Table 1, and results thereof are similarly shown in Table 8 below.

TABLE 8

| Thickness of magnetic layer (μm) | Overwrite characteristics (dB) |
| --- | --- |
| 0.21 | −42.2 |
| 0.27 | −40.0 |
| 0.49 | −36.0 |
| 0.52 | −35.7 |
| 0.57 | −33.3 |
| 0.75 | −31.2 |
| 0.79 | −30.3 |
| 0.90 | −30.0 |
| 1.05 | −26.5 |
| 1.30 | −25.2 |
| 1.55 | −23.1 |

As is apparent from this Table 8, the overwrite characteristics greatly vary depending on the thickness of the magnetic layer 10, and in this example, when the thickness of the magnetic layer exceeds 0.90 μm, the overwrite characteristics are poor, but when the thickness is not more than 0.90 μm, good overwrite characteristics (not more than −30 dB) can be obtained.

Figure 12:
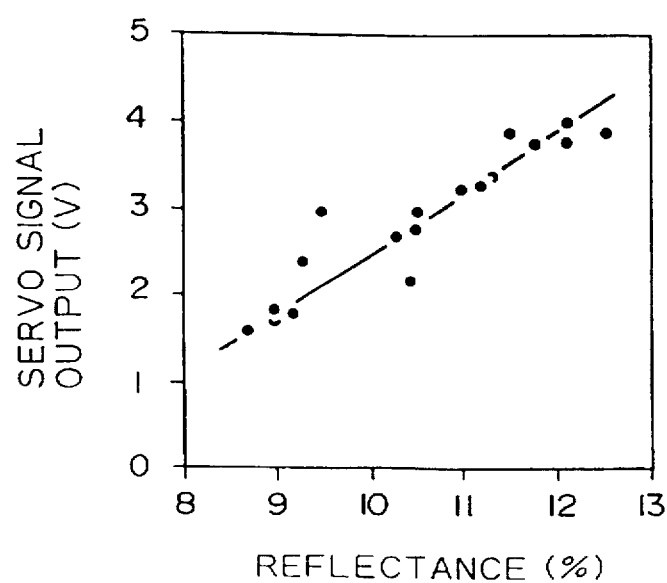
FIG. 12 is a characteristic diagram showing relationship between the reflectance of the magnetic layer and a servo signal output.

FIG. 12 is a characteristic diagram showing relationship between this light reflectance and a servo signal output. As is clear from this Figure, the light reflectance of the magnetic layer is generally in proportional relation with the servo signal output, variation in the reflectance of light at the magnetic layer resulting in variation of the servo signal output. Therefore, in order to obtain a stable servo signal output in any magnetic disk, variations in the light reflectance need to be made as small as possible.

The inventors of the present invention have made it clear from results of various kinds of experiments that in order to reduce the variation in the light reflectance to obtain a stable servo signal output, it is most effective to reduce the influence of the above-mentioned interference. Effective means for reducing the influence of the interference are, for example:

(1) to decrease the light transmittance of the magnetic layer; and (2) to decrease the reflectance of the base film.

Figure 13:
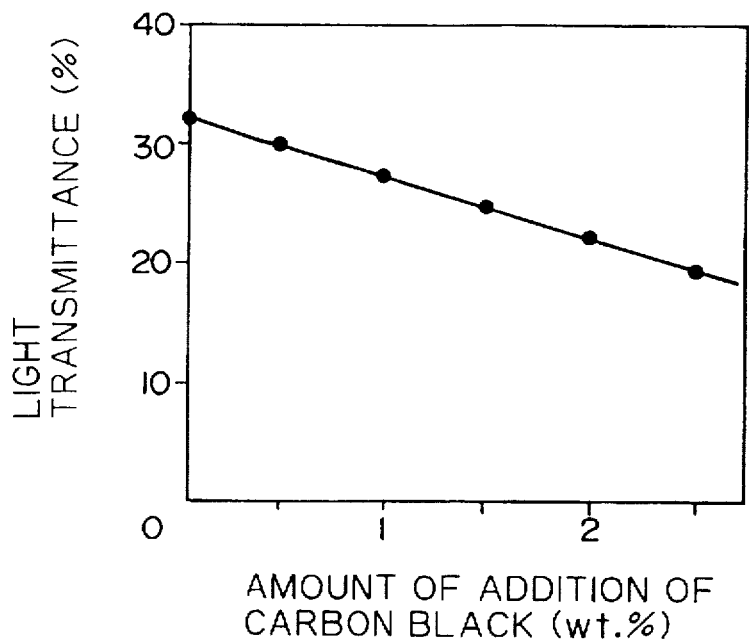
FIG. 13 is a characteristic diagram showing relationship between an amount of addition of carbon black and a light transmittance of the magnetic layer.

As to the above item (1), that is, the means for decreasing the light transmittance of the magnetic layer, the addition of carbon black has been studied. FIG. 13 is a characteristic diagram showing relationship between an amount of addition of carbon black and the light transmittance of the magnetic layer. As is clear from this Figure, by adding 1.5 wt. % carbon black, the light transmittance of the magnetic layer can be decreased to 25%, and by adding 2 wt. % carbon black, the light transmittance of the magnetic layer can be decreased to a level close to 20%. By thus increasing the amount of addition of carbon black, the light transmittance of the magnetic layer can be decreased. On the other hand, when the amount of addition of carbon black is increased, amounts of the other magnetic layerconstituting materials, such for example as the magnetic material and the binder, is necessarily limited, and therefore the amount of addition of the carbon black is suitably 1 to 10 wt. %, and preferably in the range of 1 to 7 wt. %, and more preferably in the range of 1.5 to 5 wt. %.

Incidentally, when the light transmittance of the magnetic layer is lowered, the influence by the interference is reduced; however, the light reflectance of the magnetic layer is lowered, whereas, by enhancing the surface properties of the magnetic layer, the light reflectance of the magnetic layer can be increased.

The means for enhancing the surface properties of the magnetic layer includes means for decreasing the surface roughness of the magnetic layer and means for enhancing the dispersibility and fluidity of the magnetic coating material. The latter means will be specifically explained in connection with means (later described) for reducing optical noises, and therefore explanation thereof is omitted here.

Figure 14:
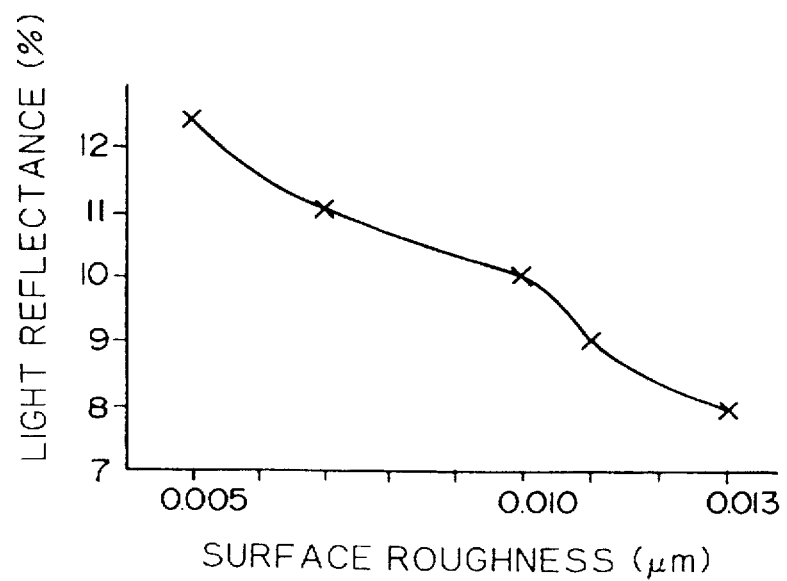
FIG. 14 is a characteristic diagram showing the relation between the time of polishing of the magnetic layer surface, its surface roughness, and its light transmittance.

FIG. 14 is a diagram showing relationship between the surface roughness and the light reflectance of the magnetic layer of the composition example 1 having 4 wt. % carbon black added thereto. As is clear from this Figure, if the surface roughness (centerline average roughness Ra) is not more than 0.01 µm, the light reflectance of the magnetic layer can be not less than 10%.

As means for decreasing the reflectance of the base film, there are means for a type of the base film having a discontinuous irregular-reflection film of palladium or an inorganic compound such as aluminum oxide, or a light-absorbing film of an organic compound of a coloring matter or a dye formed on the surface of the base film, means for using a type of base film having a surface to which a matting process or the like is applied so as to cause an irregular reflection thereat, and means for using a type of base film containing a light-absorbing agent, such as carbon black.

Figure 15A:
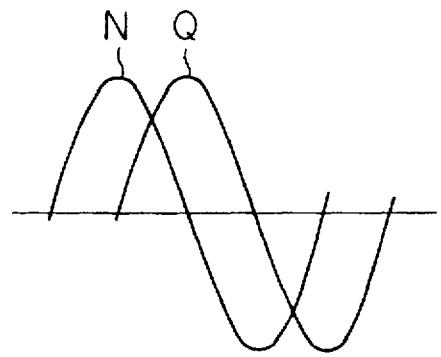
FIGS. 15(a) and (b) constitute a diagram explanatory of the formation of a servo signal.
Figure 15B:
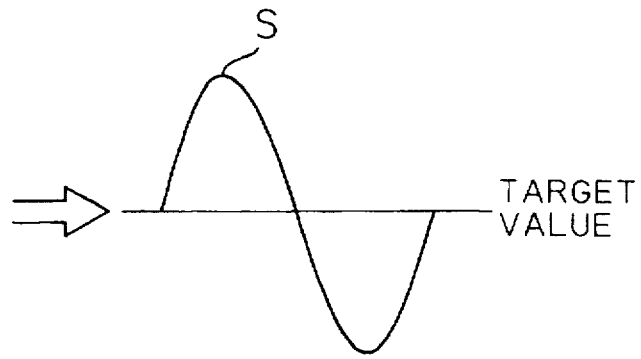

FIG. 15 is an illustration explanatory of the formation of a servo signal, and (a) of FIG. 15 is an illustration showing an output waveform N based on a difference between a detection value of the light-receiving element 32a shown in FIG. 8 and a detection value of the light-receiving elements 32b, as well as an output waveform Q based on a difference between a detection value of the light-emitting element 32c and a detection value of the light-emitting element 32d. The two waveforms N and Q are out of by 90 degrees from with each other. The servo signal waveform S as shown in (b) of FIG. 15 is formed from the two waveforms N and Q.

Figure 16A:
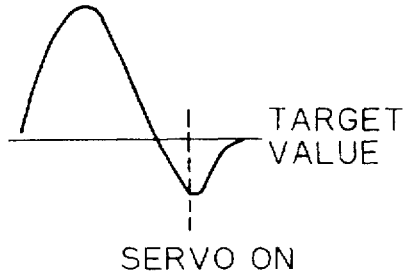
FIGS. 16A and 16B are views explanatory of influence of optical noises on the servo signal.
Figure 16B:
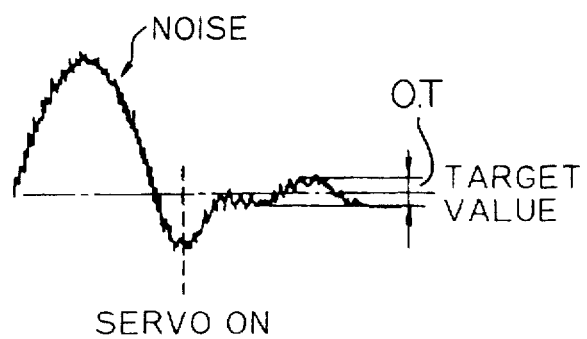

FIGS. 16A and 16B are illustrations explanatory of the influence of optical noises on the servo signal, and FIG. 16A shows a waveform produced when optical noises are not present, and FIG. 16B shows a waveform produced when optical noises are present. In the absence of the optical noises as shown in FIG. 16A, the magnetic head can be smoothly guided to a predetermined position (target value) when the servo is turned on; however, in the presence of the optical noises as shown in FIG. 16B, the magnetic head can not be guided to the predetermined position (target value) within a short time after the servo is turned on, so that an off-track (O.T) takes place. Here, the optical noises mean noises which are added to the servo signal by an optical interference.

The inventors of the present invention have analyzed such optical noises, and made various studies of the characteristics thereof, and have finally found that the optical noises can be divided into a noise (noise X) due to the surface roughness of the magnetic layer, a noise (noise Y) which can be corrected by an electric circuit, and a noise (noise Z) which can not be corrected and gives a significant influence on the tracking servo of the magnetic head.

Figure 17:
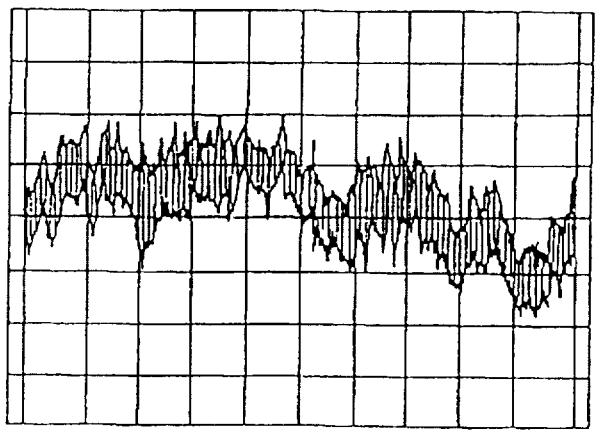
FIG. 17 is a diagram showing an original waveform of optical noises.

FIG. 17 is a diagram showing an original waveform of optical noises observed in this kind of magnetic disk. Upon analyzing frequencies of the optical noises, they are divided into a noise whose frequency is in the range of not less than 2 KHz, a noise whose frequency is in the range of less than 100 Hz, and a noise whose frequency is in the range of between more than 100 Hz and less than 2 KHz, and the waveforms of these noises are shown in FIGS. 18, 19 and 20, respectively.

Figure 18:
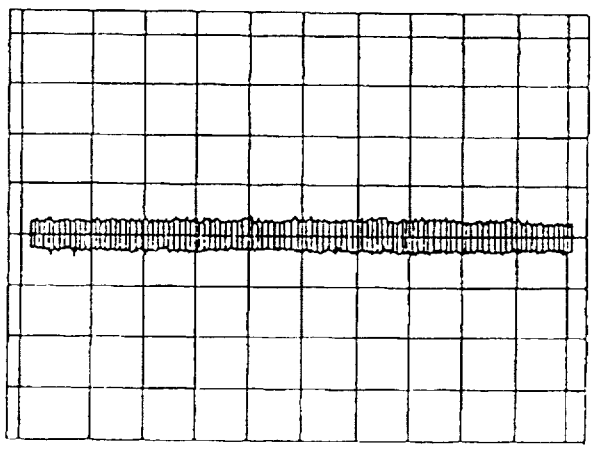
FIG. 18 is a diagram showing a waveform of noises in a frequency range of not less than 2 KHz.

The noise shown in FIG. 18 is thought to be the noise X due to the surface roughness of the magnetic layer, and since this noise is in the range where the gain of the servo control system sufficiently is small, the inventors of the present invention have confirmed that this noise does not give an influence on the tracking servo of the magnetic head.

Figure 19:
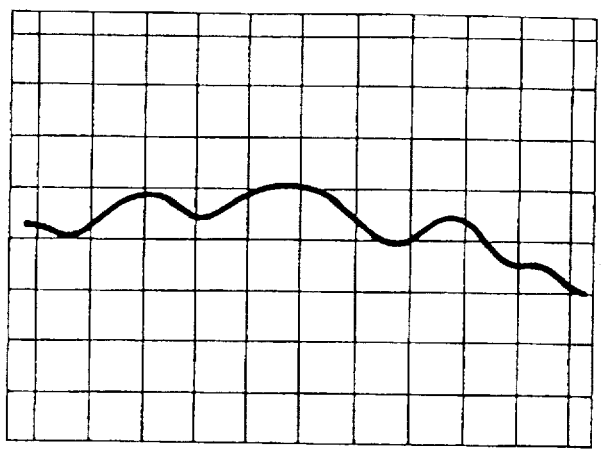
FIG. 19 is a diagram showing a waveform of noises in a frequency range of less than 100 Hz.

The noise shown in FIG. 19 is one (noise Y) produced by variation in the intensity of the interfered light due to the variation in the thickness of the magnetic layer. Since by applying a servo to the intensity of light-emitting of the light source such as the LED, this noise can be smoothed (corrected), the inventors of the present invention have confirmed that this noise does not adversely affects the tracking servo almost at all.

Figure 20:
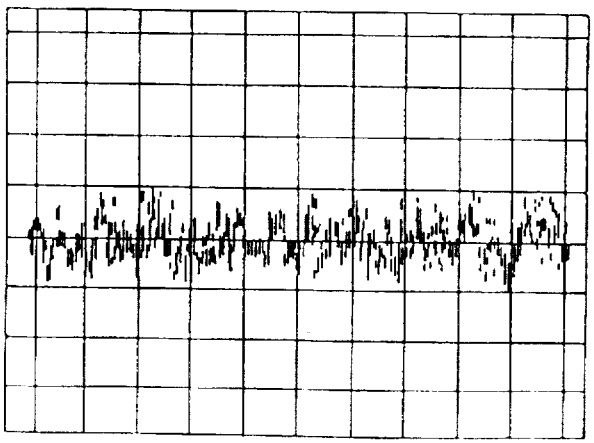
FIG. 20 is a diagram showing a waveform of noises in a frequency range of between more than 100 Hz and less than 2 Kz.

In contrast with these, the inventors of the present invention have confirmed that the noise shown in FIG. 20, that is, the noise Z whose frequency is in the range of between more than 100 Hz and less than 2 KHz, is not of a nature that can be smoothed (corrected) by applying a servo to the light source circuit, but that this noise gives a significant influence on the tracking servo of the magnetic head. Therefore, in order to effect a proper tracking servo, it is important to reduce the noise in this frequency range.

On this noise whose frequency is in the range of between more than 100 Hz and less than 2 KHz, the influence by variations in the thickness of the magnetic layer has been studied. In this study, polyethylene terephthalate (PET) having a thickness of 62 µm, was used as a base film, and in order to impart electrical conductivity, an extremely thin film of polyaniline (having a thickness of 500 Å) was deposited onto the surface of the base film.

Using the following composition example 4 as a magnetic coating material, a magnetic layer whose target film thickness was 0.89 µm was formed.

EXAMPLE 4 OF MAGNETIC COATING COMPOSITION

Figure 21:
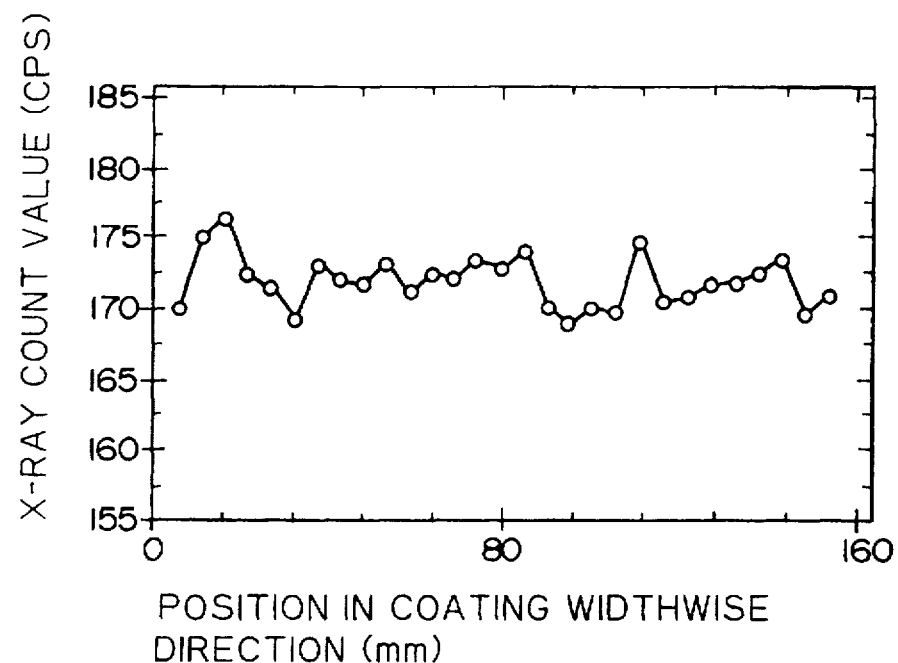
FIG. 21 is a characteristic diagram showing variations in the film thickness of a magnetic layer before improvement.
Figure 22:
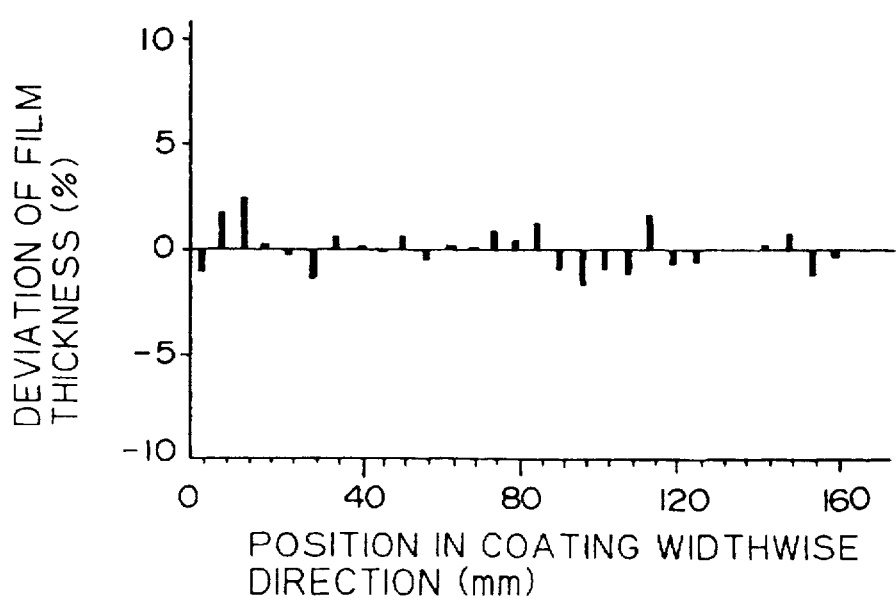
FIG. 22 is a characteristic diagram showing deviations of the film thickness of the magnetic layer before improvement.

Barium ferrite 100 parts by weight
Vinyl chloride-vinyl acetate-vinyl alcohol copolymer 11.0 parts by weight
Urethane resin 6.6 parts by weight
Trifunctional isocyanate compound 4.4 parts by weight
Aluminum oxide powder 15 parts by weight (Average particle size: 0.43 [µm])
Carbon black 4 parts by weight (Average particle size: 0.3 [µm])
Oleyl oleate 6 parts by weight
Cyclohexanone 150 parts by weight
Toluene 150 parts by weight First, variation in the film thickness of the magnetic layer and a deviation ratio thereof ({[measured film thickness value] [average value]}/average value) were measured over a range of 160 mm (6 inches) in a coating widthwise direction (direction perpendicular to the direction of proceeding of the coating), and results thereof are shown in FIGS. 21 and 22. In FIG. 21, the abscissa axis represents the measurement position in the coating widthwise direction (the position 0 mm means a position 10 mm from the lateral end in the coating widthwise direction), and the ordinate axis represents an X-ray count value by a XRF (X-ray fluorescence) coating thickness gauge. In FIG. 22, the abscissa axis represents the measurement position in the coating widthwise direction, and the ordinate axis represents the deviation ratio of the film thickness reduced by the above X-ray count value.

A SFT-156A type gauge manufactured by Senko Denshi Kogyo was used as the XRF coating thickness gauge. While shifting the measurement position at intervals of 5 mm in the coating widthwise direction, the X-ray was applied to form a spot having a diameter of 1 mm, and an amount of fluorescent X-ray of iron per second (count/sec: cps), generated from the magnetic layer, was measured at each measurement position. The X-ray irradiation time was 20 seconds, and the measurement was done three times at the same position, and the average value thereof was taken as the X-ray count value.

It will be apparently appreciated from FIGS. 21 and 22 that the film thickness of the magnetic layer is varied in the coating widthwise direction.

Figure 23:
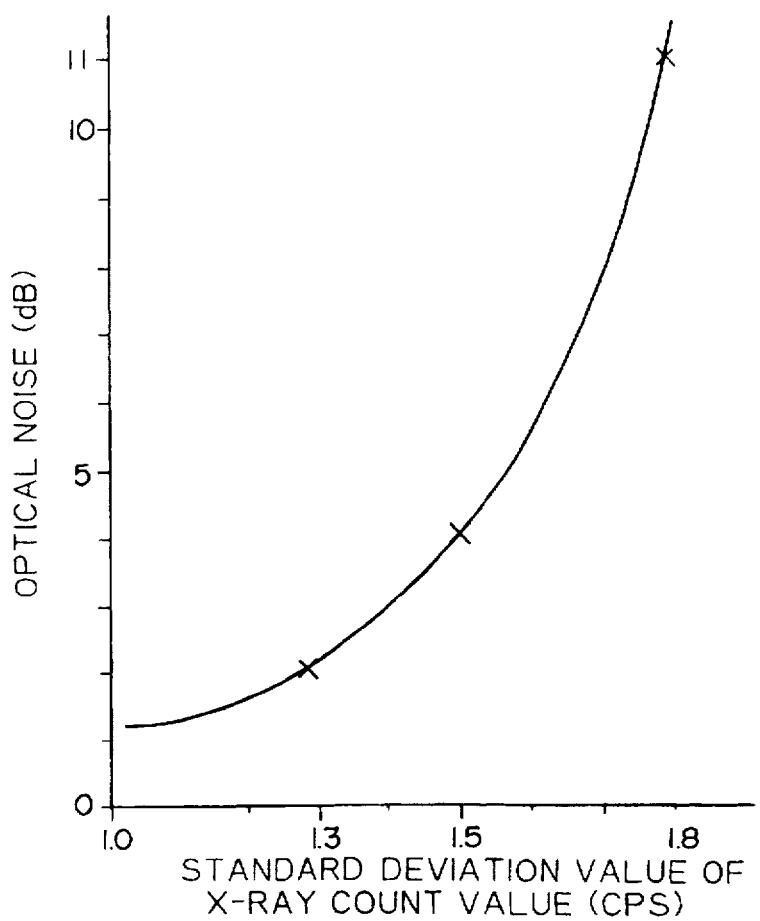
FIG. 23 is a characteristic diagram showing relationship between a standard deviation value of an X-ray count value and optical noises.

FIG. 23 is a diagram showing results of study about relationship between a standard deviation of the X-ray count values and the optical noise whose frequency is in the range of between more than 100 Hz and less than 2 KHz. Variation in the light reflectance from a magnetic layer in which the tracking recesses had not yet been formed were measured in the form of variation in a sum signal from the four-divided photodetector as shown in FIG. 8. The noise signal level (N) was defined by the following formula, using a circuit noise (Nc) measured by a R.M.S voltmeter and a total noise (Nt) obtained by addition of a varying signal (noise) of the light reflectance of the magnetic disk to a circuit noise (Nc):

$$N=-20 \log (Nc/Nt) \text{ [dB]}$$

As regards the reflectance variation of not more than 90 Hz, assuming that the servo of the drive current in the light-emitting element can follow, the optical noise having passed through a low-pass filter of 90 Hz was measured.

As is apparent from FIG. 23, when the standard deviation of the X-ray count value exceeds 1.8 cps, the optical noise rapidly increases, so that a problem in reliability arises; however, when the standard deviation of the X-ray count value is not more than 1.5 cps, the optical noise can be kept to not more than 4 dB. Further, when the standard deviation of the X-ray count value is not more than 1.3 cps, the optical noise can be kept to not more than 2 dB, thereby enhancing the reliability.

Next, relationship between this optical noise and the off-track has been studied. In a system in which the track density is, for example, as low as 135 Tpi, there is used a method in which side erases are provided respectively on opposite sides of a read/write gap of a magnetic head so as to erase the erasure residue which failed to be erased at the time of overwrite due to the offtrack; however, as the track density becomes high, for example, to 1200 to 2400 Tpi, a space between the adjacent data tracks is necessarily decreased, and if the side erasing is effected as described above, there is a possibility that information on the adjacent data track may also be erased, and therefore in the magnetic disk with a high density track, there is used a method in which the side erasing is not effected.

Figure 24:
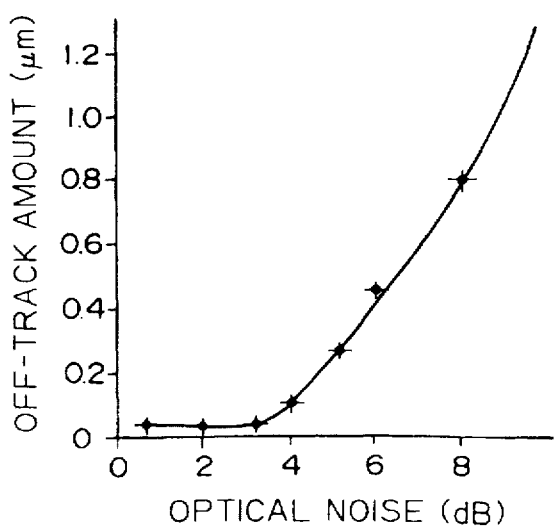
FIG. 24 is a characteristic diagram showing relationship between optical noises and an off-track value.

In this method, however, when an off-track occurs, the erasure residue due to the off-track directly forms the noise, thereby significantly lowering the reliability. FIG. 24 is a characteristic diagram showing relationship between the optical noise and the off-track amount in the magnetic layer of the composition example 1. As is clear from this diagram, when the optical noise is not more than 1 dB, the off-track is substantially zero, and when the optical noise is 4 dB, the off-track amount is 0.15 µm, and when the optical noise is 5 dB, the off-track amount rises up to 0.3 µm. Therefore, it will be appreciated that the off-track amount markedly increases with the increase of the optical noise.

An overwrite (O.W) amount due to this off-track is represented by the following formula:

$$O.W = \frac{(1F)}{(2F)} \left( 1 + \frac{d}{gw-d} \times \frac{(1F)}{(1F')} \right)$$

1F': residual output of overwrite upon ontrack
1F: low-frequency output
2F: high-frequency output
gw: track width
d: off-track amount If an optical noise of 5 dB is produced when 1F=0 dB, 1F'=−31 dB and 2F=−1 dB are provided, the off-track amount is 0.3 µm for the track width of 15 µm. As a result, the overwrite amount is deteriorated to −25.2 dB from its essential value of −30 dB.

The inventors of the present invention have conducted various kinds of experiments, and have found from results thereof that in order to obtain sufficient reliability, the overwrite amount be not more than −27 dB. Therefore, for example, when the optical noise is 4 dB, the off-track amount of 0.15 µm for the track width of 15 µm gives the overwrite amount of −27.3 dB in contrast with its essential value of −30 dB, so that sufficient reliability can be obtained.

When the thickness of the magnetic layer becomes smaller, the overwrite amount becomes smaller as clearly seen from the above Table 8, so that the reliability can be further increased.

As to specific means for keeping the X-ray count value to not more than 1.5 cps so as to reduce the optical noise in the above-mentioned manner, wettability of the base film was first studied.

(1) Study of Base Film

The wettability of the base film was evaluated by measuring an angle of contact of the base film with a predetermined liquid. With respect to the contact angle of the base film, a sample was dipped in the predetermined liquid (a liquid of mixture of cyclohexanone and toluene both of which were the same weight), and a resultant force of a surface tension and a buoyancy developing at that time was measured, and the contact angle θ was derived by the following formula:

$$F = \gamma \cos \theta \cdot l - A \cdot \rho \cdot D$$

F: wetting stress
γ: surface tension of liquid
θ: contact angle
l: length of contact between the predetermined liquid and the base film.
A: cross-sectional area of the base film
ρ: density of the predetermined liquid
D: depth of dipping of the base film
A·ρ·D: buoyancy term Table 11 below shows the contact angle θ of various kinds of base films, and in this Table, PET represents polyethylene terephthalate, PET+SiO2+PA represents a film of polyethylene terephthalate having fine particles of SiO2 coated on a surface thereof, and having a polyaniline electro-conductive film (500 Å) further formed thereon, and PET+PA represents a film of polyethylene terephthalate having a polyaniline electro-conductive film (500 Å) formed directly on a surface thereof without coating fine particles of SiO2 thereon.

TABLE 9

| Base film | Contact angle θ (degrees) |
|---|---|
| PET alone | 17 |
| PET + PA | 29 |
| PET + SiO2 + PA | 38 |

As is apparent from these results, the film of PET alone has a very small contact angle θ and has a good wettability, while the contact angle θ increases in the order of PET+PA and PET+SiO2+PA.

Next, the fluidity of the magnetic coating material has been studied.

(2) Study of Very Fine Particles of Carbon Black

Influences affecting on the optical noise in a case where fine carbon black was used alone as carbon black, as well in a case where very fine carbon black was added to such fine carbon black, were studied, and results thereof are shown in Table 10 below.

TABLE 10

| Fine C.B/Very fine C.B | Base film | Optical noise (dB) |
|---|---|---|
| 3.0/0.0 | PET + SiO2 + PA | 7.87 |
| 2.0/1.0 | PET | 1.52 |
| " | PET + PA | 3.62 |
| " | PET + SiO2 + PA | 6.20 |
| 2.0/2.5 | PET | 1.47 |
| " | PET + PA | 1.83 |
| " | PET + SiO2 + PA | 2.00 |

In Table 10, fine C.B represents carbon black having an average particle size of 0.3 μm, and very fine C.B represents very fine carbon black having an average particle size of 0.02 μm. 6 parts by weight of oleyl oleate was added as a lubricant to each sample.

As is clear from this Table, by the addition of the very fine carbon black, the dispersibility and fluidity of the magnetic coating material were made good, and the standard deviation of the X-ray count value was kept to not more than 1.5 cps, so that the optical noise could be reduced. Particularly, the base film of PET alone is low in optical noise, and in the case of the base films having polyaniline thereon, the base film (PET)+PA having polyaniline formed directly on the surface thereof without coating SiO2 on the surface of the base film has smoother surface of the base film, so that the fluidity of the magnetic coating material becomes good, and is therefore suitable.

It is appropriate that the mixture ratio of the very fine carbon black (having the average particle size of 0.015 to 0.07 μm) to the fine carbon black (having the average particle size of 0.07 to 0.4 μm) be 1/10 to 10/1.

(3) Study of Lubricant

In order to reduce a sliding contact resistance between the magnetic layer and the magnetic head, a lubricant such as oleyl oleate is contained in the magnetic layer, and the relation between the amount of addition thereof and optical noises were studied. In this study, oleyl oleate was used as the lubricant. The amount of the lubricant per 1 m² of the magnetic layer is shown in Table 11 below. The amount of the lubricant was calculated by difference of weights of the magnetic recording medium before and after rinsing rinsed with normal hexane.

TABLE 11

| Amount of lubricant (mg/m²) | Optical noise (dB) |
|---|---|
| 10 | 7.5 |
| 20 | 5.1 |
| 25 | 4.0 |
| 30 | 3.2 |
| 50 | 2.0 |
| 100 | 1.5 |

As is apparent from this Table, when the amount of the lubricant per 1 m² of the magnetic layer is not less than 25 mg, and preferably 30–100 mg, the optical noise is reduced. A theoretical reason why the optical noise can be reduced by increasing the amount of addition of the lubricant is not clear, but observing the condition of coating of the magnetic coating material, it is presumed that the fluidity of the magnetic coating material is improved by increasing the amount of the lubricant.

In this study, although oleyl oleate was used as the lubricant, various lubricants such as higher fatty acid such as stearic acid and oleic acid, higher fatty acid ester such as glycerin oleate, 2-hexyl decyl stearate, 2-ethyl hexyl oleate, tridecyl stearate and butoxyethyl stearate, liquid paraffin, squalane, fluorine oil, and silicone oil can be used.

Table 12 below collectively shows the above base films, the addition of very fine carbon black, the amount of increase of the lubricant, and a combination of the addition of the very fine carbon black with the amount of increase of the lubricant (oleyl oleate). In this Table, mark o represents those having the optical noise of not more than 2 dB, and mark X represents those having the optical noise of more than 2 dB, and a numeral in "( )" represents the measured value of the optical noise.

TABLE 12

| Base film (contact angle | Fine C.B alone | Fine C.B/ very fine C.B = 2.0/2.5 | Amount of increase of lubricant | Combination of fine C.B/very fine C.B with increased amount of lubricant |
|---|---|---|---|---|
| PET alone (q = 16°) | o (1.50) | o (1.47) | o (2.5) | o (0.8) |
| PET + PA (q = 29°) | x (4.5) | o (1.83) | o (3.3) | o (1.20) |
| PET + SiO₂ + PA (q = 38°) | x (5.3) | o (2.00) | x (6.7) | o (1.30) |

As is apparent from this Table, in the case of PET alone without coating SiO$_2$ and polyaniline (PA), the contact angle (θ) is small, and therefore the optical noise is low in any case.

In the case of the base films having polyaniline (PA) coated on the surface of PET, the optical noise could be reduced by adding the very fine carbon black, by increasing the amount of the lubricant, or by combining the addition of the very fine carbon black with the increased amount of the lubricant.

Further, in the case of the base films having SiO2 coated on the surface of PET and having polyaniline (PA) applied thereon, the optical noise could be reduced by adding the very fine carbon black or by combining the addition of the very fine carbon black with the increased amount of the lubricant.

Figure 25:
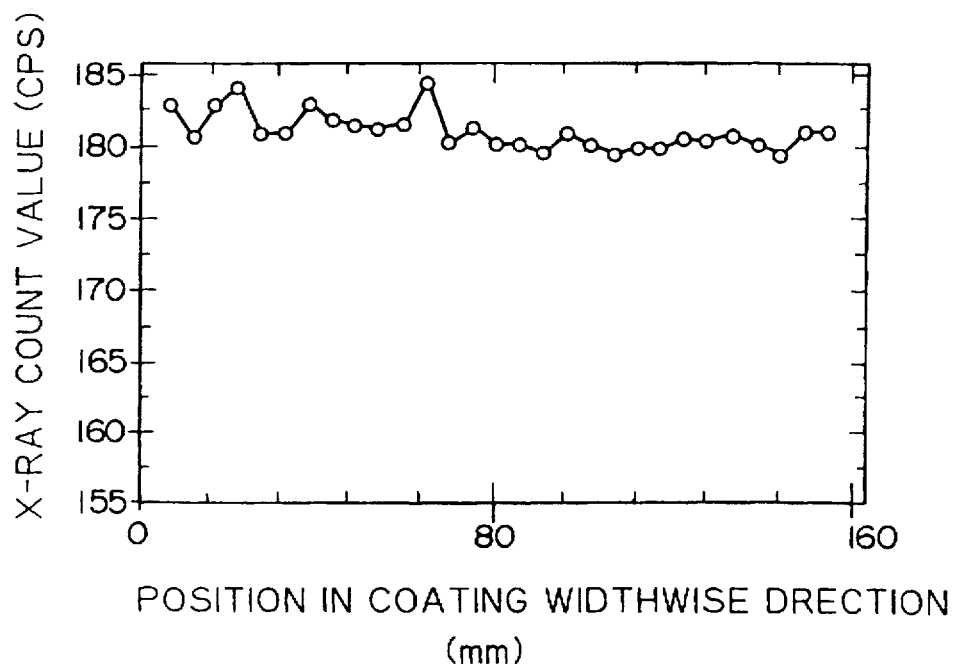
FIG. 25 is a characteristic diagram showing variations in the film thickness of a magnetic layer after improvement.

FIG. 25 shows variation in the film thickness of the magnetic layer on the base film of PET alone without coating SiO2 or polyaniline (PA), wherein the addition of the very fine carbon black was combined with the increased amount of the lubricant. As is apparent from the comparison of this Figure with the above-mentioned FIG. 21, variations in the film thickness of the magnetic layer are very much smaller in FIG. 25.

Figure 26:
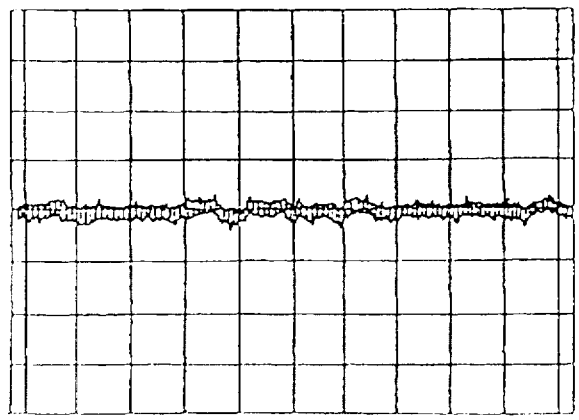
FIG. 26 is diagram showing a waveform of noises after improvement in a frequency range of between more than 100 Hz and less than 2 KHz.
Figure 27:
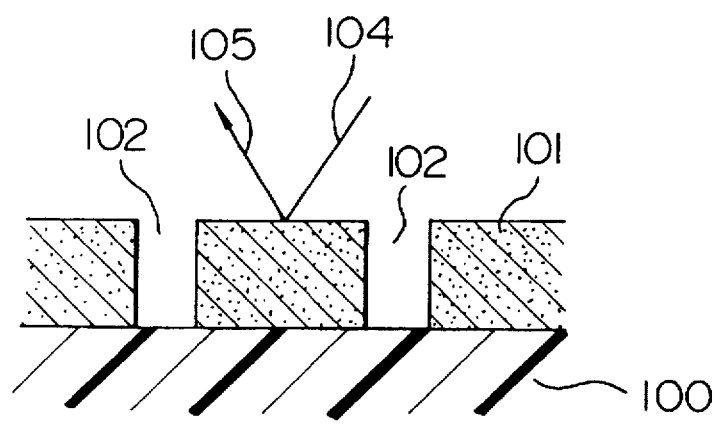
FIG. 27 is an enlarged, sectional view of the conventionally-proposed magnetic recording medium.
Figure 28:
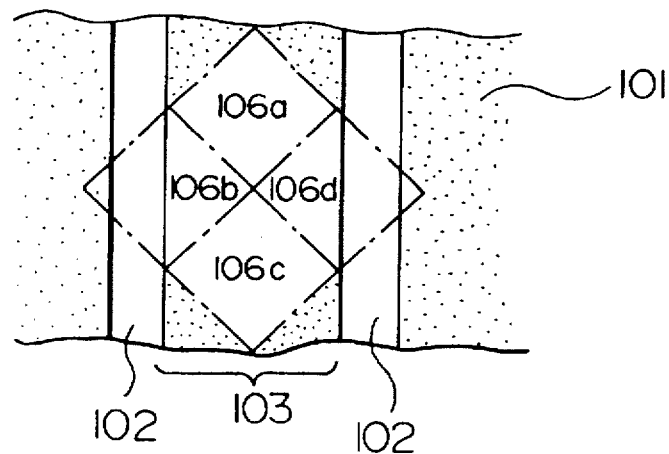
FIG. 28 is an explanatory view showing an arrangement of light-receiving elements on this conventional magnetic recording medium.

FIG. 26 is a characteristic diagram showing the noise whose frequency is in the range of between more than 100 Hz and less than 2 KHz in a case of the base film of PET alone without coating SiO2 or polyaniline (PA) wherein the addition of the very fine carbon black was combined with the increased amount of the lubricant.

As is apparent from the comparison of this Figure with the above-mentioned FIG. 20, the optical noise is very much smaller in FIG. 26.

As the magnetic material, ferrite such as barium ferrite, or magnetic powder of metal such as α-Fe can be suitably used. In the case of ferrite, if its plate diameter (the greatest diagonal length) exceeds 0.1 μm, the optical noise is increased, and therefore the plate diameter of the ferrite should be limited to not more than 0.1 μm, and preferably to a range of 0.03 to 0.08 μm. On the other hand, in the case of the metallic magnetic powder, if its major axis length exceeds 0.3 μm, the optical noise is increased, and therefore the major axis length of the metallic magnetic powder should be limited to not more than 0.3 μm, and preferably to a range of 0.1 to 0.28 μm.

In the above embodiments, although explanation has been made with respect to the disk-like magnetic recording medium, the present invention can be applied to other forms of magnetic recording medium such as a magnetic card.

We claim:

1. A magnetic recording medium comprising:
   a substrate made of a non-magnetic material; and a magnetic layer formed on said substrate, wherein the magnetic layer comprises a magnetic material and a binder;
   a multiplicity of magnetic head-tracking optical recesses formed at predetermined intervals in said magnetic layer, wherein between adjacent optical recesses of said multiplicity of optical recesses a data track for recording desired information is formed having a thickness, defined by measurement by an electron microscope, which is limited to not more than 0.9 micrometers, and
   wherein light is applied to said magnetic head-tracking recesses and said data track so as to effect a tracking of a magnetic head in accordance with light reflected thereby; and
   wherein variation in light reflectance is limited to not more than 4 dB in a frequency range of between more than 100 Hz and less than 2 KHz.

2. A magnetic recording medium according to claim 1, in which the light reflectance of said magnetic layer except for said magnetic head-tracking optical recesses is not less than 10%.

3. A magnetic recording medium according to claim 1, in which magnetic powder in said magnetic layer comprises ferrite or metallic magnetic powder.

4. A magnetic recording medium according to claim 3, in which said ferrite is barium ferrite.

5. A magnetic recording medium according to claim 4, in which a plate diameter of said barium ferrite is not more than 0.1 μm.

6. A magnetic recording medium according to claim 3, in which a major axis length of said metallic magnetic powder is not more than 0.3 μm.

7. A magnetic recording medium according to claim 1, in which the angle of contact of said non-magnetic material with a liquid mixture of equal amounts cyclohexane and toluene is not more than 30 degrees.

8. A magnetic recording medium according to claim 1, in which the surface centerline average roughness Ra of said magnetic layer except for said magnetic head-tracking optical recesses is not more than 0.01 μm.

9. The magnetic recording medium according to claim 1, in which carbon black having an average particle size of not more than 0.05 μm is contained in said magnetic layer.

10. A magnetic recording medium according to claim 1, in which a first carbon black, having an average particle size of not more than 0.05 μm, and a second carbon black larger in average particle size than said first carbon black are contained in a mixed manner in said magnetic layer.

11. The magnetic recording medium according to claim 1, in which the magnetic layer includes a lubricant in an amount, per 1 m$^2$ of said magnetic layer, not less than 25 mg.

12. A magnetic recording medium according to claim 1, further comprising carbon black having an average particle size of not more than 0.05 μm is contained in said magnetic layer, and the amount of lubricant per 1 m$^2$ of said magnetic layer is not less than 25 mg.

13. A magnetic recording medium according to claim 1, in which a first carbon black, having an average particle size of not more than 0.05 μm, and a second carbon black larger in average particle size than said first carbon black are contained in a mixed manner in said magnetic layer, and the amount of lubricant per 1 m$^2$ of said magnetic layer is not less than 25 mg.

14. A magnetic recording medium according to claim 1, in which the angle of contact of said non-magnetic material with a liquid mixture of equal amounts of cyclohexane and toluene is not more than 30 degrees;
   a first carbon black, having an average particle size of not more than 0.05 μm, and a second carbon black larger in average particle size than said first carbon black are contained in a mixed manner in said magnetic layer; and
   an amount of lubricant per 1 m$^2$ of said magnetic layer is not less than 25 mg.

15. The medium as in claim 1, wherein the magnetic layer comprises:
   a range of 1%–10% by weight of carbon black, based on the total weight of the magnetic layer.

16. The medium as in claim 15, wherein:
   the percentage range of carbon black by weight in the magnetic layer is 1%–7%, based on the total weight of the magnetic layer.

17. The medium as in claim 16, wherein:
   the percentage range of carbon black by weight in the magnetic layer is 1.5%–5%, based on the total weight of the magnetic layer.

18. A magnetic recording medium comprising:

a substrate made of a non-magnetic material; and a magnetic layer formed on said substrate wherein said magnetic layer comprises a magnetic material and a binder;

a multiplicity of magnetic head-tracking optical recesses formed at predetermined intervals on said magnetic layer, wherein between adjacent optical recesses of said multiplicity of optical recesses a data track for recording desired information is formed, and wherein the thickness of said magnetic layer at said data track is limited to any one range selected from the group consisting of 0.31 to 0.45 μm, 0.55 to 0.67 μm and 0.81 to 0.97 μm; and wherein the light reflectance of said magnetic layer except for said magnetic head-tracking optical recesses is not less than 10%.

19. A magnetic recording medium according to claim 18, in which the thickness of said magnetic layer at said data track is limited to any one range selected from the group consisting of 0.35 to 0.43 μm, 0.59 to 0.66 μm and 0.85 to 0.94 μm.

20. A magnetic recording medium according to claim 18, in which said magnetic recording medium having said film thickness is adapted to be used in a magnetic recording/reproducing device in which the center wavelength λ of light applied from a light-emitting magnetic head-tracking element to said magnetic layer is in a range of 740 to 940 nm, and an incident angle θ of said light is set to not more than 70 degrees.

21. A magnetic recording medium according to claim 20, in which center wavelength is within a range defined by following two equations:

[nm]=-2.2θ+860 [nm]

[nm]=-2.2θ+990 [nm].

22. A magnetic recording medium according to claim 20, in which said center wavelength is between

[nm]=-2.2θ+890 [nm]

[nm]=-2.2θ+950 [nm].

23. A magnetic recording medium according to claim 18, in which the average particle size of magnetic powder contained in said magnetic layer is not more than 0.06 μm.

24. A magnetic recording medium according to claim 18, in which said magnetic powder is plate-like ferrite.

25. A magnetic recording medium according to claim 24, in which said plate-like ferrite is barium ferrite.

26. A magnetic recording medium according to claim 16, in which the surface roughness Ra of said data track is not more than 0.015 μm.

27. A magnetic recording medium according to claim 18, in which a reflective film is formed between said substrate and said magnetic layer.

28. The medium as in claim, wherein the reflective film comprises a metal or a metal oxide.

29. The medium as in claim 28, wherein the reflective film comprises aluminum, tin, nickel, copper, or titanium oxide.

30. A magnetic recording medium comprising:

a substrate made of a non-magnetic material; and a magnetic layer formed on said substrate wherein the magnetic layer comprises a magnetic material and a binder;

a multiplicity of magnetic head-tracking optical recesses are formed at predetermined intervals on said magnetic layer, wherein between adjacent optical recesses of said multiplicity of optical recesses a data track for recording desired information is formed and wherein the depth of said magnetic head-tracking optical recess is limited to not less than 0.15 μm; and wherein the light reflectance of said magnetic layer except for said magnetic head-tracking optical recesses is not less than 10%.

31. A magnetic recording medium according to claim 30, in which the depth of said magnetic head-tracking optical recess is limited to not less than 0.20 μm.

32. A magnetic recording medium comprising:

a substrate made of a non-magnetic material; and a magnetic layer formed on said substrate wherein said magnetic layer comprises a magnetic material and a binder;

a multiplicity of magnetic head-tracking optical recesses formed at predetermined intervals in said magnetic layer, wherein between adjacent optical recesses of said multiplicity of optical recesses a data track for recording desired information is formed having a thickness, defined by measurement by an electron microscope, which is limited to not more than 0.9 micrometers, and wherein light is applied to said magnetic head-tracking recess and said data track so as to effect a tracking of a magnetic head in accordance with light reflected thereby; and wherein an X-ray is applied at predetermined intervals to a surface of said magnetic layer to form a constant diameter spot thereon, and a standard deviation of a count value of a fluorescent X-ray of iron per second which is generated from said magnetic layer, is limited to not more than 1.5 counts/second; and wherein the light reflectance of said magnetic layer except for said magnetic head-tracking optical recesses is not less than 10%.

* * * * *